US011712387B2

(12) United States Patent
Fouts et al.

(10) Patent No.: US 11,712,387 B2
(45) Date of Patent: Aug. 1, 2023

(54) TABLE MOUNT FOR A TOUCHSCREEN DEVICE

(71) Applicant: Stryker Corporation, Kalamazoo, MI (US)

(72) Inventors: Brian Fouts, Morgan Hill, CA (US); Lauren Thomas, Oakland, CA (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/235,538

(22) Filed: Apr. 20, 2021

(65) Prior Publication Data

US 2021/0236368 A1 Aug. 5, 2021

Related U.S. Application Data

(62) Division of application No. 16/781,778, filed on Feb. 4, 2020, now Pat. No. 11,285,064.

(60) Provisional application No. 62/802,634, filed on Feb. 7, 2019.

(51) Int. Cl.
| | |
|---|---|
| *F16M 11/00* | (2006.01) |
| *A61G 13/10* | (2006.01) |
| *F16M 13/02* | (2006.01) |
| *F16M 11/10* | (2006.01) |
| *F16M 11/20* | (2006.01) |
| *G06F 3/041* | (2006.01) |

(52) U.S. Cl.
CPC ......... *A61G 13/101* (2013.01); *F16M 11/105* (2013.01); *F16M 11/2042* (2013.01); *F16M 13/022* (2013.01); *A61G 2203/16* (2013.01); *A61G 2203/20* (2013.01); *F16M 2200/022* (2013.01); *F16M 2200/068* (2013.01); *G06F 3/041* (2013.01)

(58) Field of Classification Search
CPC .. A61G 13/01; F16M 11/105; F16M 11/2042; F16M 13/022
See application file for complete search history.

(56) References Cited

U.S. PATENT DOCUMENTS

| | | | |
|---|---|---|---|
| 2005/0006542 A1* | 1/2005 | Henning | ............ F16M 11/2064 248/274.1 |
| 2008/0029661 A1 | 2/2008 | Chen | |
| 2010/0117281 A1 | 5/2010 | Doyle | |
| 2010/0327129 A1 | 12/2010 | Chen | |
| 2011/0315843 A1 | 12/2011 | Hung | |
| 2012/0175474 A1 | 7/2012 | Barnard et al. | |
| 2013/0314890 A1 | 11/2013 | Smith | |

(Continued)

OTHER PUBLICATIONS

Fouts et al., U.S. Notice of Allowance and Fee(s) due dated Nov. 19, 2021, directed to U.S. Appl. No. 16/781,778; 8 pages.

(Continued)

*Primary Examiner* — Amy J. Sterling
(74) *Attorney, Agent, or Firm* — Morrison & Foerster LLP

(57) ABSTRACT

The present disclosure is directed to table mount for mounting a touchscreen device to a surgical table. The table mount includes a clamp configured to releasably secure the table mount to the table, a first arm rotatably connected to the clamp and configured to extend vertically from the surgical table, a second arm rotatably connected to the first arm, and a touchscreen device docking assembly rotatably connected to the second arm and configured to hold a touchscreen device.

23 Claims, 16 Drawing Sheets

(56) References Cited

U.S. PATENT DOCUMENTS

| | | | |
|---|---|---|---|
| 2014/0138506 A1 | 5/2014 | Dahl | |
| 2014/0367137 A1 | 12/2014 | Leung | |
| 2016/0296401 A1 | 10/2016 | Cole et al. | |
| 2016/0324701 A1* | 11/2016 | Cambridge | A61G 1/00 |
| 2018/0140309 A1 | 5/2018 | Fouts et al. | |

OTHER PUBLICATIONS

Fouts et al., U.S. Office Action dated Jun. 29, 2021, directed to U.S. Appl. No. 16/781,778; 11 pages.
Clinical Graphics, (unknown). "3D Motion Simulations for Hip Impingement or Femoroacetabular Impingement (FAI)," Clinical Graphics (Zimmer Biomet), Brochure, located at https://protect-us.mimecast.com/s/IEvgCL950GHGPv2vUB_54g?domain=clinicalgraphics.com, last visited on Feb. 2, 2021, 6 pages.
EastShore Medical Supply. "Roll Stand for Tablet iPad Ulstrasound Imaging System, Sunken base," located at https://www.eastshoremedical.com/Roll-Stand-for-Tablet-iPad-Ulstrasound-Imaging-System-Sunken-base_p_585.html, visited on Apr. 4, 2018. (4 pages).
Fouts et al., U.S. Office Action dated Aug. 3, 2020, directed to U.S. Appl. No. 16/781,778; 12 pages.
Fouts et al., U.S. Office Action dated Mar. 15, 2021, directed to U.S. Appl. No. 16/781,778; 12 pages.
Fouts et al., U.S. Restriction Requirement dated Apr. 22, 2020, directed to U.S. Appl. No. 16/781,778; 6 pages.
GE Healthcare. (2011). "OEC 9900 Elite Premium Digital Mobile Imaging System", 14 pages.
Gordon et al. (Mar. 1989). "1988 Anthropometric Survey of U.S. Army Personnel: Summary Statistics Interim Report," Anthropology Research Project, Inc.; 335 pages.
Marv Golden Pilot Supplies. "RAM Tough Claw Mount for iPads," located at https://www.marvgolden.com/ram-tough-claw-mount-for-ipads.html?gclid=EAIaIQobChMIqfWPwabL7gIVph6tBh0_9gfDEAQYASABEgJNxvD_BwE#663=2639, visited on Apr. 4, 2018. (2 pages).
MobilDrTech. "Tryten Nova Pro Medical Tablet Station—Hospital Grade—Basic—Call for Quotes 281-340-2013," located at https://www.telemedicinesupply.com/products/nova-2-tablet-cart-basic, visited on Apr. 4, 2018. (9 pages).
PubMed. "Effect of changes in pelvic tilt on range of motion to impingement and radiographic parameters of acetabular morphobic characteristics," AM J Sports Med 2014, located at https://pubmed.ncbi.nlm.nih.gov/25060073/, last visited on Feb. 3, 2021, 2 pages. Abstract Only.
Smith & Nephew. (2014). "PLAN Begins Here the revolutionary way to visualize FAI and develop a patient-specific preoperative plan to correct it," 40 pages.
Stryker Navigation. (2012). "NAV3 the Next Generation of Surgical Navigation Platforms," Stryker, Brochure, located at https://www.stryker.com/content/dam/stryker/navigation/products/stryker-adapt-platform/resources/Stryker-NAV3-Platform-brochure.pdf, last visited on Feb. 2, 2021, 4 pages.
Stryker. (2019). "Stryker ADAPT Platform," Stryker, Brochure, located at https://www.stryker.com/us/en/navigation/products/stryker-adapt-platform.html, last visited on Feb. 2, 2021, 3 pages.
Wodajo. (Jun. 16, 2010). "Test driving the iPad in the operating room," located at https://orthoonc.wordpress.com/2010/06/16/test-driving-the-ipad-in-the-operating-room/, visited on Apr. 4, 2018. (4 pages).

* cited by examiner

TABLE MOUNT FOR A TOUCHSCREEN DEVICE

CROSS-REFERENCE TO RELATED APPLICATIONS

This application is a divisional of U.S. application Ser. No. 16/781,778 filed on Feb. 4, 2020, which claims the benefit of U.S. Provisional Application No. 62/802,634, filed Feb. 7, 2019, the entire contents of each of which are hereby incorporated by reference herein.

FIELD

This disclosure relates to a table mount for a touchscreen device. More particularly, this disclosure relates to table mount that clamps to the rail of a surgical table and holds a touchscreen device above the patient during surgery.

BACKGROUND

There are many situations in which touchscreen devices or tablets are used during surgery. For example, surgeons often review digital X-rays, MRIs, or CT scans while performing an operation or surgeons rely on touchscreen devices during computer guided surgery. As such, the touchscreen devices should be available for convenient viewing during the procedure.

Previous commercial solutions for touchscreen devices in the sterile field included those devices that were either mounted on roll stands or loose in a sterile bag or autoclaved case that often rested on the patient. However, these roll stands crowded the operating room and the devices in the loose bags/cases could potentially enter the actual surgical field during the procedure or accidentally bump into the patient during surgery. In addition, both the roll stands and the devices in the loose bags/cases were often not able to be positioned in the correct location during surgery or in a position convenient for the specific surgeon performing the procedure.

SUMMARY

Applicant has discovered a table mount for a surgical table configured to hold a touchscreen devices or tablets above the patient during surgery. The table mount disclosed herein can releasably and quickly clamp to the surgical table. In addition, the table mount has several movable joints for adjustment and a docking station that mates with the touchscreen devices. These movable joints have a controlled friction force to hold the touchscreen devices in whatever position it's placed even when the surgical table is tilted by up to about 17.5 degrees. As such, the table mount can easily be moved around during surgery, but not so easy that a surgeon's touch inputs on the touchscreen device would move the table mount itself.

The table mount disclosed herein has six degrees of freedom to allow it to be positioned and rotated freely as desired for a give surgeon. The table mount can also allow a surgeon to comfortably use software on a touchscreen device while facing the same direction they would normally face during surgery. In some embodiments, the table mount can clamp to a rail of a surgical table anterior to the arm board (i.e., near a patient's shoulder if a patient is on the surgical table) if an arm board is used. The proximal arm of the table mount can rise and curve over the top of the arm board, whereas the distal arm can extend over a portion of the patient or a portion of the surgical table. As such, the touchscreen devices can be positioned directly in the line of sight of the surgeon (i.e., just below the surgical display). In addition, the touchscreen device can also be within arm's reach of the surgeon and can freely rotate (roll, pitch, and yaw) to the desired viewing angle of the surgeon.

In some embodiments, a table mount for mounting a touchscreen device to a surgical table includes a clamp configured to releasably secure the table mount to a surgical table; a first arm rotatably connected to the clamp and configured to extend vertically from the surgical table and rotate with respect to the clamp around a first axis when mounted to the surgical table; a second arm rotatably connected to the first arm, wherein the second arm rotates with respect to the first arm around a second axis; and a touchscreen device docking assembly rotatably connected to the second arm and configured to hold a touchscreen device, wherein the docking assembly rotates with respect to the second arm around a third axis. In some embodiments, the first axis is parallel to the second axis. In some embodiments, the third axis is parallel to the first and second axes. In some embodiments, the clamp is configured to releasably secure the table mount to the surgical table at a plurality of positions on the surgical table. In some embodiments, the first arm is configured to extend vertically at least 15 inches above the surgical table when the table mount is mounted to the surgical table. In some embodiments, the touchscreen device docking assembly is configured to extend vertically at least 15 inches above the surgical table when the table mount is mounted to the surgical table. In some embodiments, the touch screen device docking assembly is configured to extend towards a direction that is parallel with the plane of the surgical table's top surface and over the surgical table's top surface when the table mount is mounted to the surgical table. In some embodiments, the touchscreen device docking assembly is configured to extend at least 15 inches across the surgical table in a direction that is parallel with the plane of the surgical table's top surface. In some embodiments, the first arm is rotatably connected to the clamp by a first friction joint. In some embodiments, the torque required to rotate the first arm about the first friction joint is at least 50 in-lbf. In some embodiments, the second arm is rotatably connected to the first arm by a second friction joint. In some embodiments, the torque required to rotate the second arm about the second friction joint is at least 20 in-lbf. In some embodiments, the touch screen device docking assembly is rotatably connected to the second arm by a third friction joint. In some embodiments, the torque required to rotate the touch screen device docking assembly about the third friction joint is at least 5 in-lbf. In some embodiments, the second arm comprises a tilting joint, wherein the tilting joint rotates the second arm with respect to the first arm around a fourth axis that is perpendicular to the first, second, and third axes. In some embodiments, the tilting joint is a counter-balance joint. In some embodiments, the torque required to rotate the second arm about the counter-balance joint is greater than 0 in-lbf. In some embodiments, the docking assembly comprises a touchscreen device docking station and a tilting joint, wherein the tilting joint rotates the touchscreen device docking station with respect to the second arm around a fifth axis that is perpendicular to the first, second, and third axes. In some embodiments, the tilting joint is a friction joint. In some embodiments, the torque required to rotate the touchscreen device docking station about the tilting joint is at least about 10 in-lbf. In some embodiments, the docking assembly comprises swivel joint, wherein the swivel joint rotates the touchscreen device docking station around a sixth axis that is perpendicular to the fifth axis. In some embodiments, the swivel joint is a friction joint. In some embodiments, the torque required to rotate the touchscreen device docking station about the swivel joint is at least about 5 in-lbf. In some embodiments, the table mount includes a touchscreen device releasably connected to the touchscreen device docking assembly. In some embodiments, the touchscreen device releasably connects to the touchscreen device docking assembly via a ball bearing press-locking mechanism. In some embodiments, the clamp releasably secures the table mount to a table rail of the surgical table. In some embodiments, the clamp comprises a threaded rod and a press plate and the threaded rod drives the press plate which sits underneath and against a side of the table rail to secure the table mount to the table rail of the surgical table.

In some embodiments, a method of attaching a table mount to a surgical table includes clamping a clamp of a table mount to a surgical table, wherein the table mount comprises: a first arm rotatably connected to the clamp by a first friction joint and configured to extend vertically from the surgical table; a second arm rotatably connected to the first arm by a second friction joint; and a touchscreen device docking assembly rotatably connected to the second arm by a third friction joint and configured to hold a touchscreen device; rotating the first arm with respect to the clamp about the first friction joint; rotating the second arm with respect to the first arm about the second friction joint; and rotating the touchscreen device docking assembly with respect to the second arm about the third friction joint. In some embodiments, the first, second, and third friction joints maintain the position of the touchscreen device docking assembly when a user applies a touch input to the touchscreen device held by the touchscreen device docking assembly. In some embodiments, the first, second, and third friction joints maintain the position of the touchscreen device docking assembly when the surgical table is tilted. In some embodiments, the torque required to rotate the first arm about the first friction joint is at least 50 in-lbf. In some embodiments, the torque required to rotate the second arm about the second friction joint is at least 20 in-lbf. In some embodiments, wherein the torque required to rotate the touchscreen device docking assembly about the third friction joint is at least 5 in-lbf.

In some embodiments, a table mount for mounting a touchscreen device to a surgical table includes a clamp configured to releasably secure the table mount to a rail of a surgical table; a first arm connected to the clamp and configured to extend vertically from the surgical table; a second arm connected to the first arm; and a touchscreen device docking assembly connected to the second arm and configured to hold a touchscreen device. In some embodiments, the first arm is rotatably connected to the clamp and rotates with respect to the clamp around an axis when mounted to the surgical table. In some embodiments, the second arm is rotatably connected to the first arm and rotates with respect to the first arm around an axis. In some embodiments, the touchscreen device docking assembly is rotatably connected to the second arm and rotates with respect to the second arm around an axis. In some embodiments, the clamp comprises a block comprising a front surface that is angled downward toward the rail of the surgical table. In some embodiments, the front surface comprises a first portion and at least one second portion that is angled downward toward the rail of the surgical table steeper than the first portion. In some embodiments, the at least one second portion is angled away from a center of the block.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

Exemplary embodiments are described with reference to the accompanying figures, in which.

In the Figures, like reference numbers correspond to like components unless otherwise stated.

DETAILED DESCRIPTION

Figure 1A:
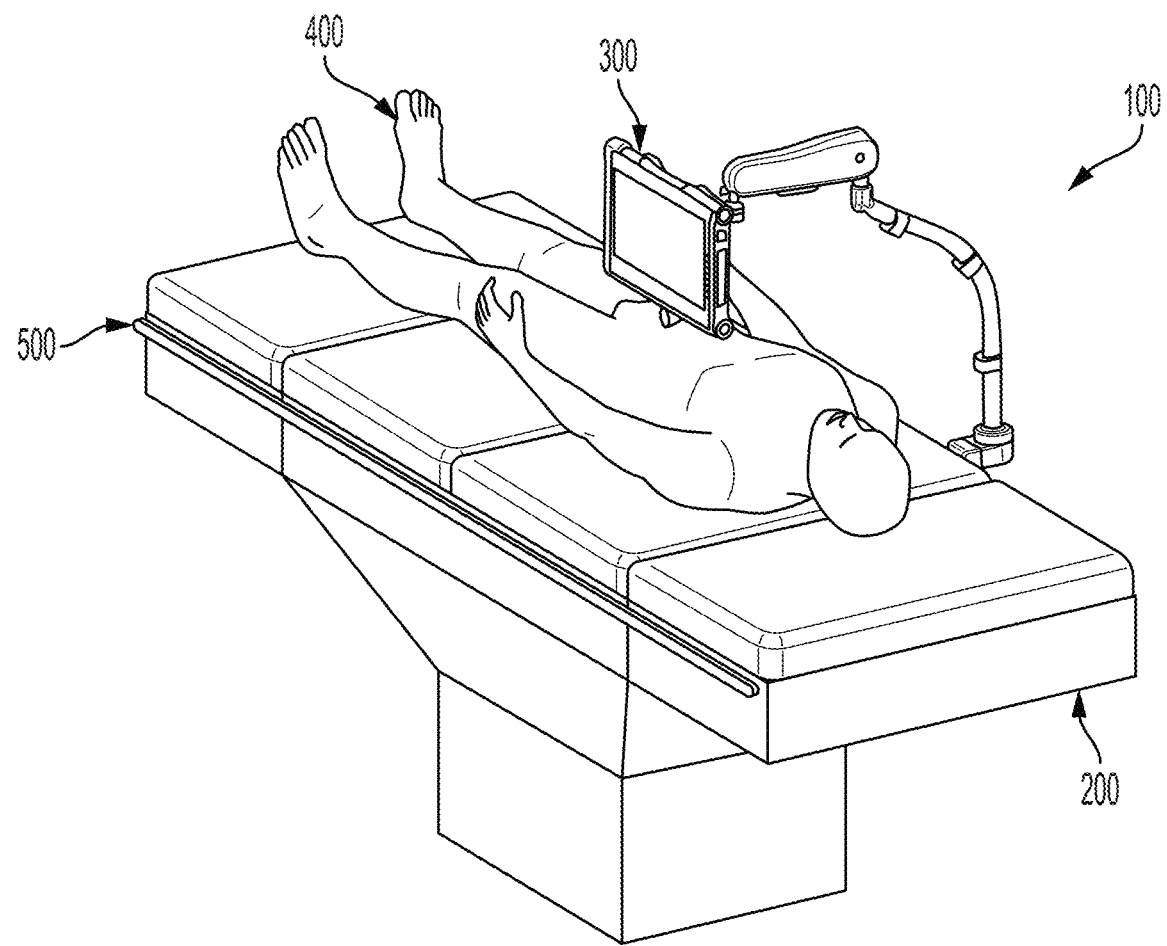
FIG. 1A illustrates an example of a table mount mounted to a surgical table that is configured to hold a touchscreen device over a patient.
Figure 1B:
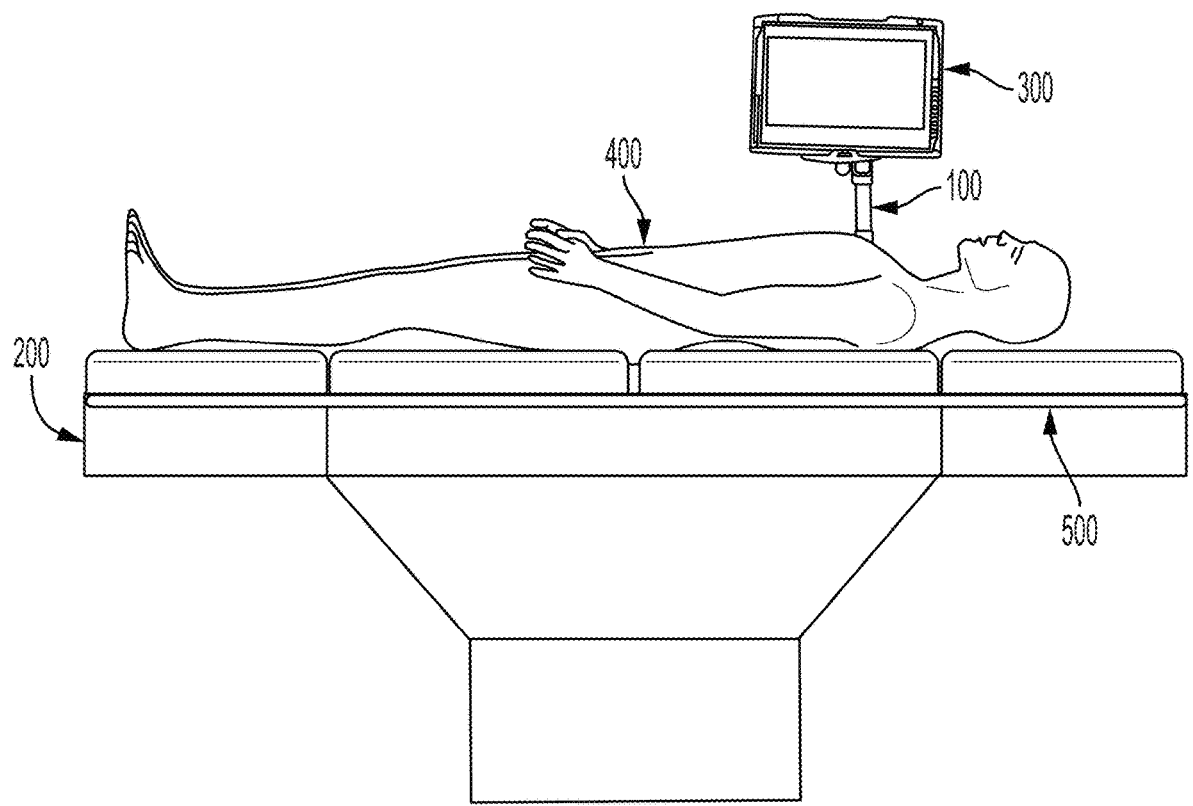
FIG. 1B illustrates an example of a side view of a table mount mounted to a surgical table that is configured to hold a touchscreen device over a patient.
Figure 1C:
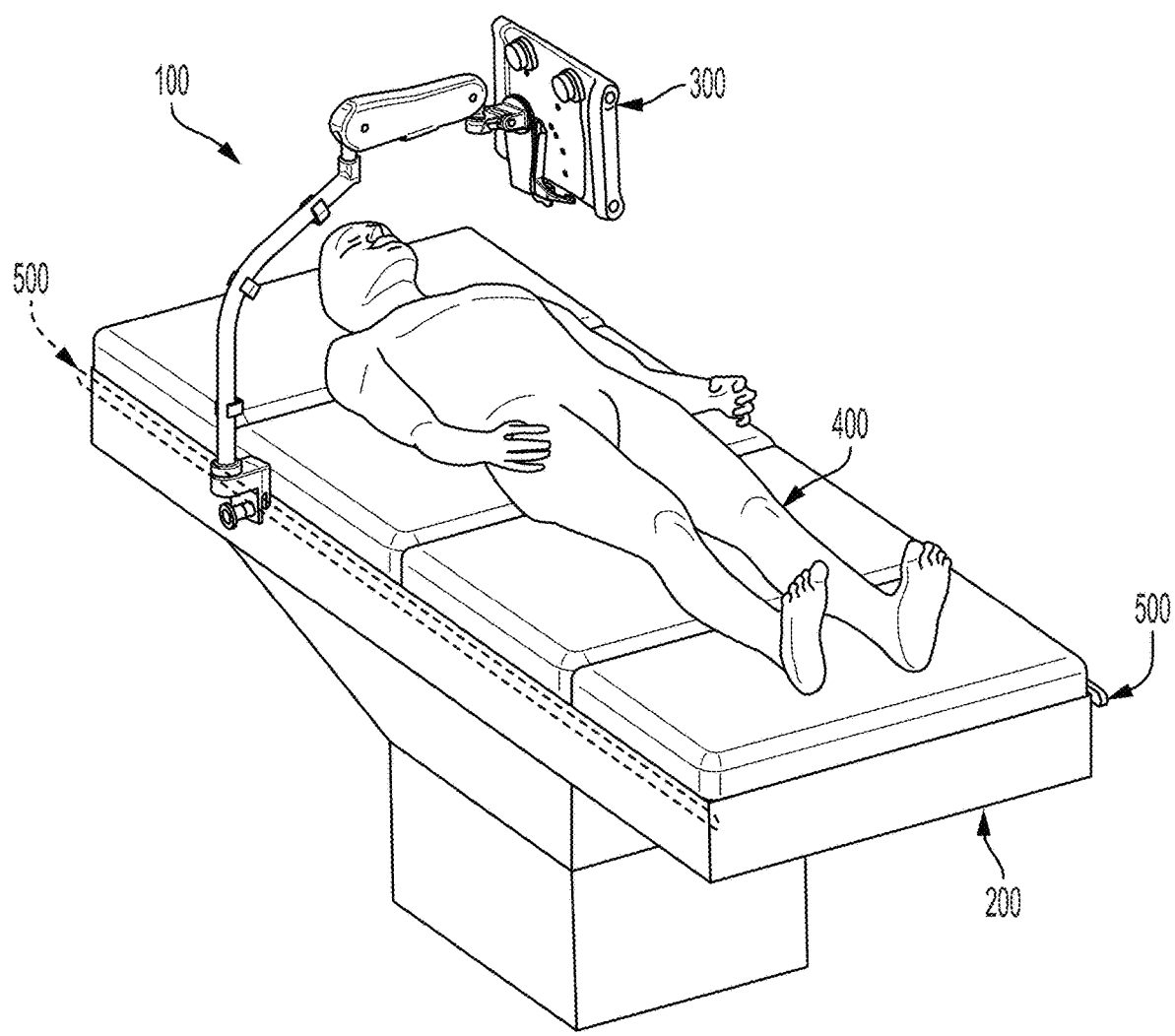
FIG. 1C illustrates an example of another view of a table mount mounted to a surgical table that is configured to hold a touchscreen device over a patient.
Figure 2A:
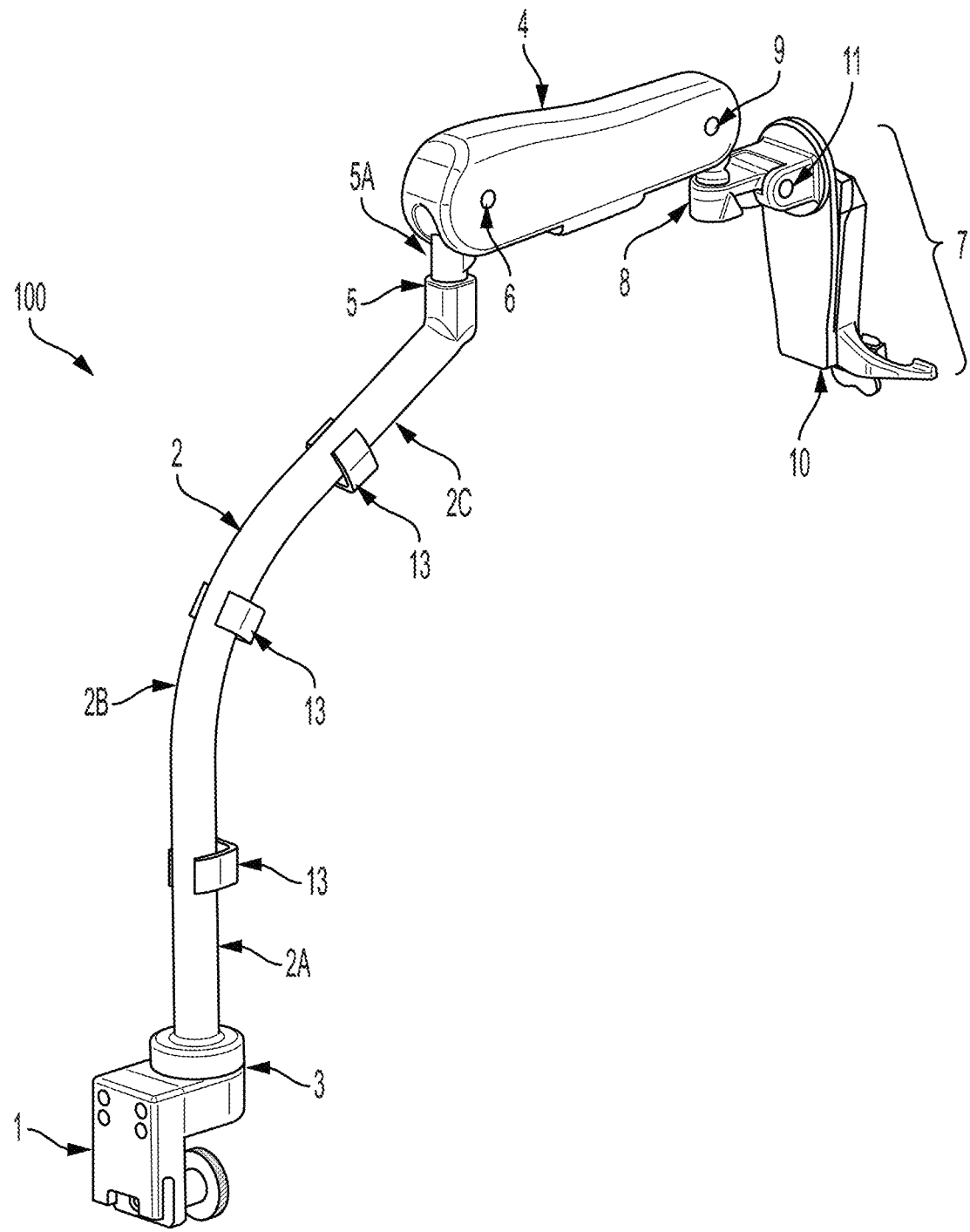
FIG. 2A illustrates an example of a view from behind of a table mount disclosed herein.
Figure 2B:
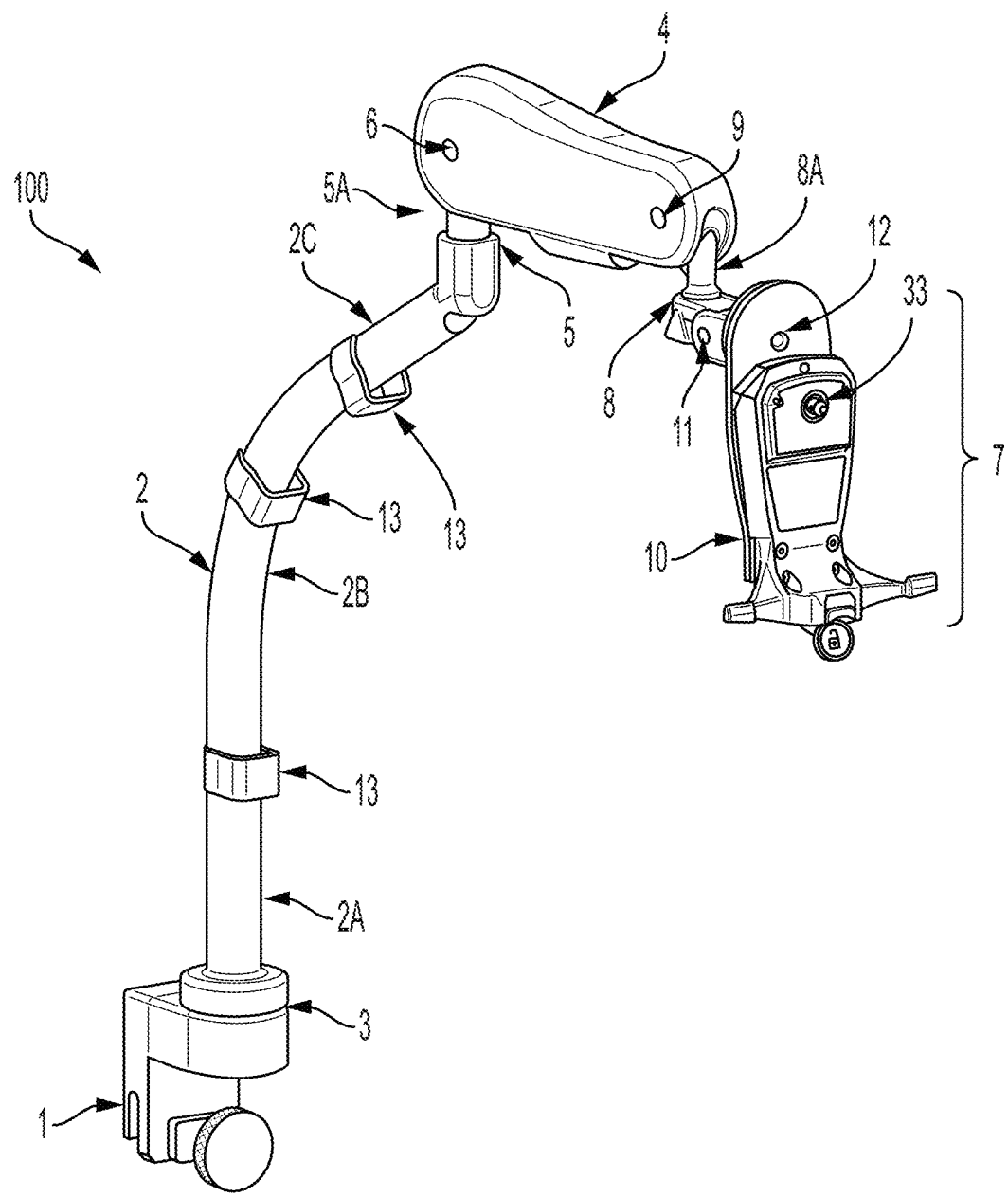
FIG. 2B illustrates an example of a view from in front of a table mount disclosed herein.
Figure 2C:
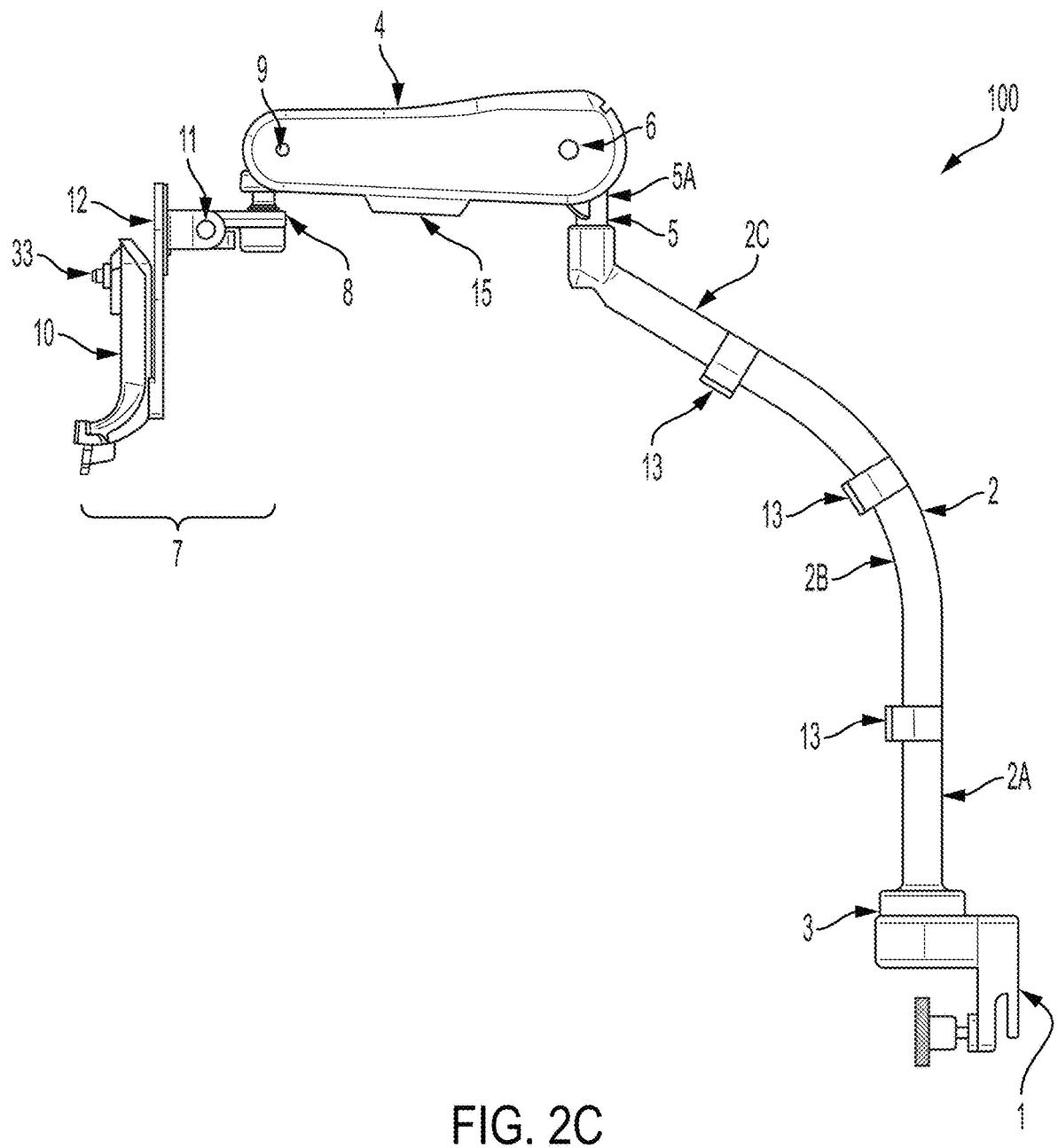
FIG. 2C illustrates an example of a side view of a table mount disclosed herein.

Applicant has discovered a table mount for a surgical table configured to hold touchscreen devices or tablets above the patient during surgery. The table mount can easily be moved around during surgery, but not so easy that a surgeon's touch inputs on the touchscreen device would move the table mount itself. FIGS. 1A-1C illustrate an example of a table mount 100 mounted to a surgical table 200 that is configured to hold a touchscreen device 300 over a patient 400 while a surgery is performed on the patient. The table mount can be attached to a rail 500 of the surgical table. This rail can be a US Standard Rail or an EU Standard Rail of a surgical table. The positioning of the touchscreen relative to the other equipment, the patient, the surgeon, and other staff can be important. In some situations, it may not be ideal to attach the table mount on the operative side of the table because this could be in the way of the surgeon, scrub nurse, and/or the mayo stand. In hip arthroscopy surgeries, it may not be ideal to mount the table mount next to the non-operative hip as the C-arm collimator may be located there. In addition, it may not be ideal for the table mount to be placed over the patient's face since the anesthesiologist may need access to the patient's face in case of an issue involving incubation. In other situations, the non-operative rail can have a table top extender and/or an arm board attached. In these situations, the table mount may not be able to be mounted in those locations. Furthermore, the position of the touchscreen device should be able to be moved in the normal line of sight for the surgeon and within arm's reach. Accordingly, the table mount disclosed herein can be capable of addressing all these problems by being able to be easily and releasably secured to any location on a rail of a surgical table as well as having six degrees of freedom which allow the touchscreen device to be positioned and rotated freely for any given surgeon.

As shown in FIGS. 1-8, table mount 100 can include a clamp 1. The clamp can releasably/removably secure the table mount to a surgical table at a plurality of positions on the surgical table. Specifically, the clamp can releasably secure the table mount to a rail of a surgical table. The clamp can be a T-handle clamp or a gravity clamp. In some embodiments, the clamp can have a knob with a threaded rod as shown in the figures. The threaded rod can drive a press plate which sits underneath and against the side of a surgical table rail. The press plate creates a frictional force to hold the clamp securely on the rail. Additionally, the press plate fits underneath the rail to prevent removal from the rail in the case of the loss of a tight, frictional securement. In some embodiments, the clamp comprises a knob and press plate (wherein the knob and press plate can be made from stainless steel), a clamp body (wherein the clamp body can be made from aluminum) and a pivot block (female portion of clamp-first arm joint) (wherein the pivot block can be made from aluminum).

Figure 9:
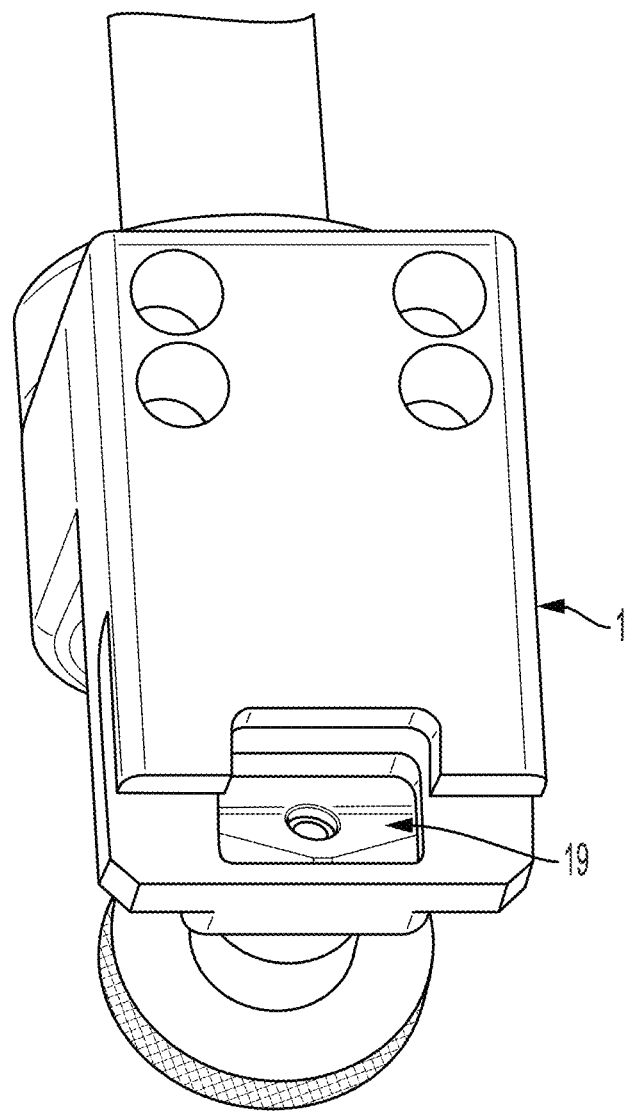
FIG. 9 illustrates an example of a clamp of a table mount as disclosed herein.
Figure 10:
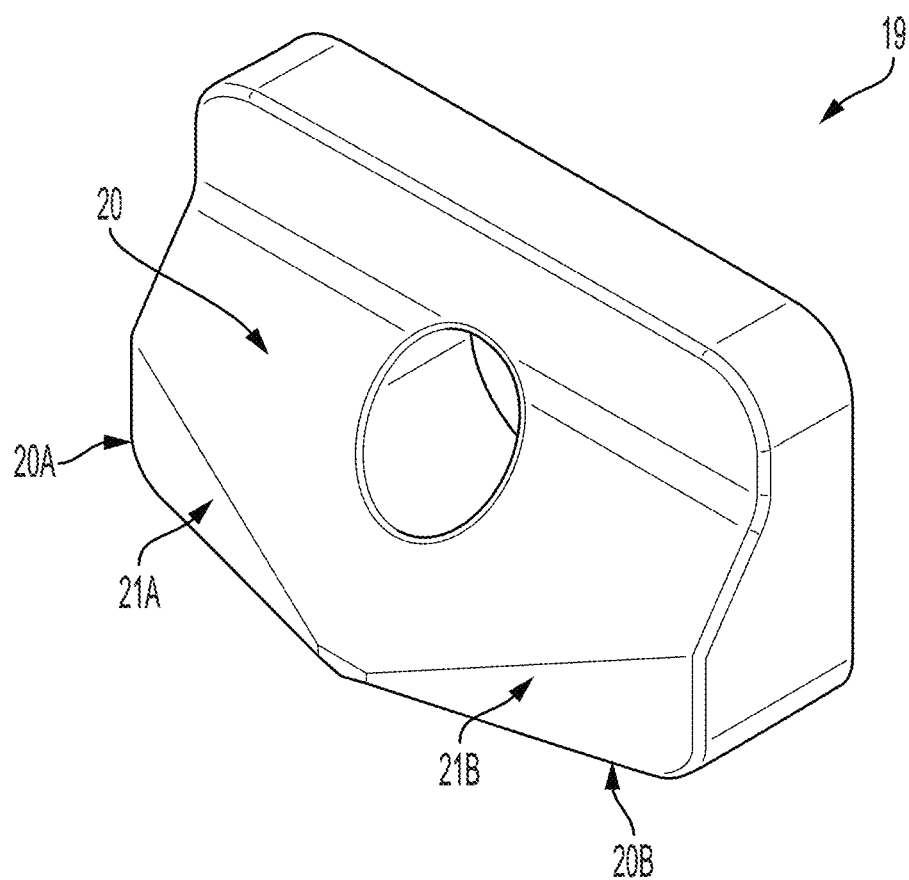
FIG. 10 illustrates an example of a block of a clamp of a table mount disclosed herein.
Figure 11:
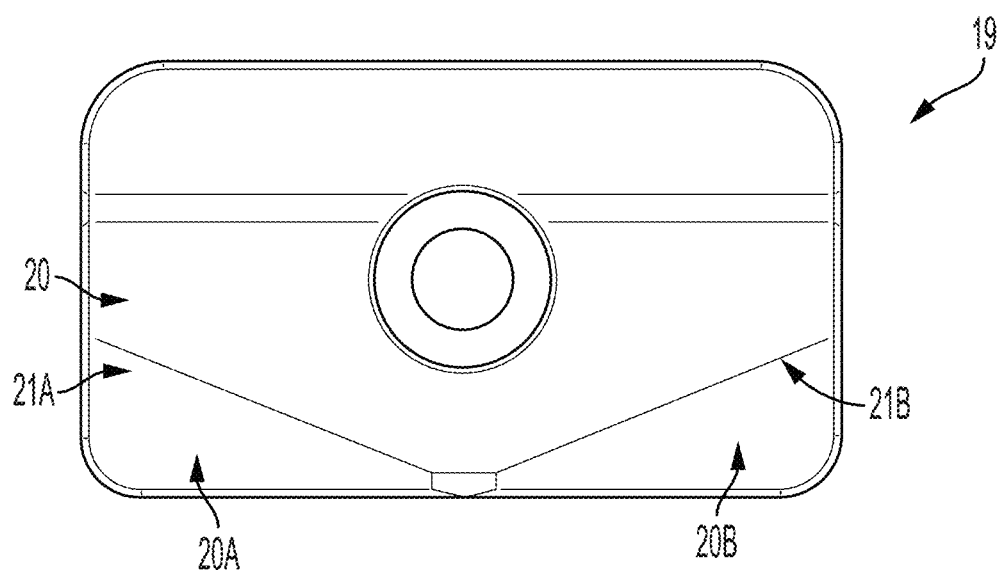
FIG. 11 illustrates an example of a front view of a block of a clamp of a table mount disclosed herein.
Figure 12:
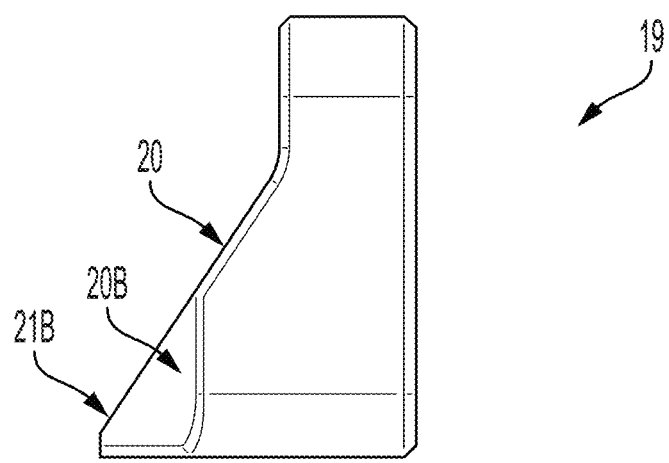
FIG. 12 illustrates an example of a side view of a block of a clamp of a table mount disclosed herein.

FIG. 9 illustrates an example of clamp 1 having a block 19. As shown in FIGS. 10-12, block 19 can have multiple surfaces to ensure proper engagement to a surgical table rail. In a typical table mount clamp, it is possible for the block to be misaligned and not actually be located under the rail of a surgical table for proper engagement. It is often difficult for a user to notice if there is a misalignment of the block to the rail. As such, there is a danger that the table mount may be mounted to the table in an unstable manner which can cause damage to the table mount or any personal around or on the table.

As shown in FIGS. 10-12, the block can have a front surface with a first portion 20 that is angled downward such that it would be angled downward toward the rail of a surgical table which it will engage with. As the block is moved forward to engage the rail of a surgical table, the angled front surface can ensure that the block reaches below the rail. As the block is further advanced toward the rail, the rail can continue to ride up the angled front surface until the table mount is properly engaged with the rail of the surgical table.

In other typical table mount clamps, it is possible for the table mount to be secured to the rail of the surgical table in a non-perpendicular position that is that at least a portion of the arm connected to the clamp is not perpendicular to the rail of the surgical table. When the table mount is secured to the rail of the surgical table in a non-perpendicular position, the table mount may not be stable or may be less stable than it should be. In addition, non-perpendicular positioning of the table mount can create wear and tear on the mount and/or on the rail of the surgical table.

At least one second portion (e.g., second portions 20A and 20B) of the front surface of the block of the table mount clamp can be angled downward at a steeper angle than the first portion 20 of the front surface such that it is angled downward toward the rail of a surgical table steeper than the angle of the front surface. In addition, the at least one second portion of the front surface can also be angled away from the center of the block in a direction that is different from the downward direction of first portion 20 of the front surface such that the at least one second portion of the front surface is angled downward and away from the center of the block.

As shown in FIGS. 10-12, two edges 21A and 21B can be created between a first portion 20 of the front surface and at least one second portion 20A and 20B of the front surface. These edges can allow the table mount clamp to initially be engaged to the rail of the surgical table in a non-perpendicular position, but as the block is advanced toward the rail, at least one of these edges can force the table mount to be secured to the rail of the surgical table in a perpendicular position.

The table mount clamp can be secured to the bed rail by tightening the clamp to the bed rail such that a user would be comfortable having the table mount suspended over a patient during surgery. Applicant discovered the minimum and maximum torques to be applied to the clamp and handle using human factor trials with numerous users. Specifically, numerous users were asked to tight the table mount clamp to the bed rail such that they would be comfortable having the table mount suspended over a patient during surgery. Next, these users were brought to a fixture with an equivalent handle mounted to a torque gauge and asked to tighten the handle to equivalent tightness to what they just did with the table mount clamp handle as well as tighten the handle with as much torque as they could with one hand. From the data, Applicant discovered that the lower torque for connection force during misuse testing is between about 15-30 in-lbf, about 15-25 in-lbf, or about 18.9-22.2 in-lbf. In addition, Applicant discovered that the max torque for clamp durability testing is between about 55-90 in-lbf, about 60-85 in-lbf, or about 65.2-80.8 in-lbf.

Figure 3:
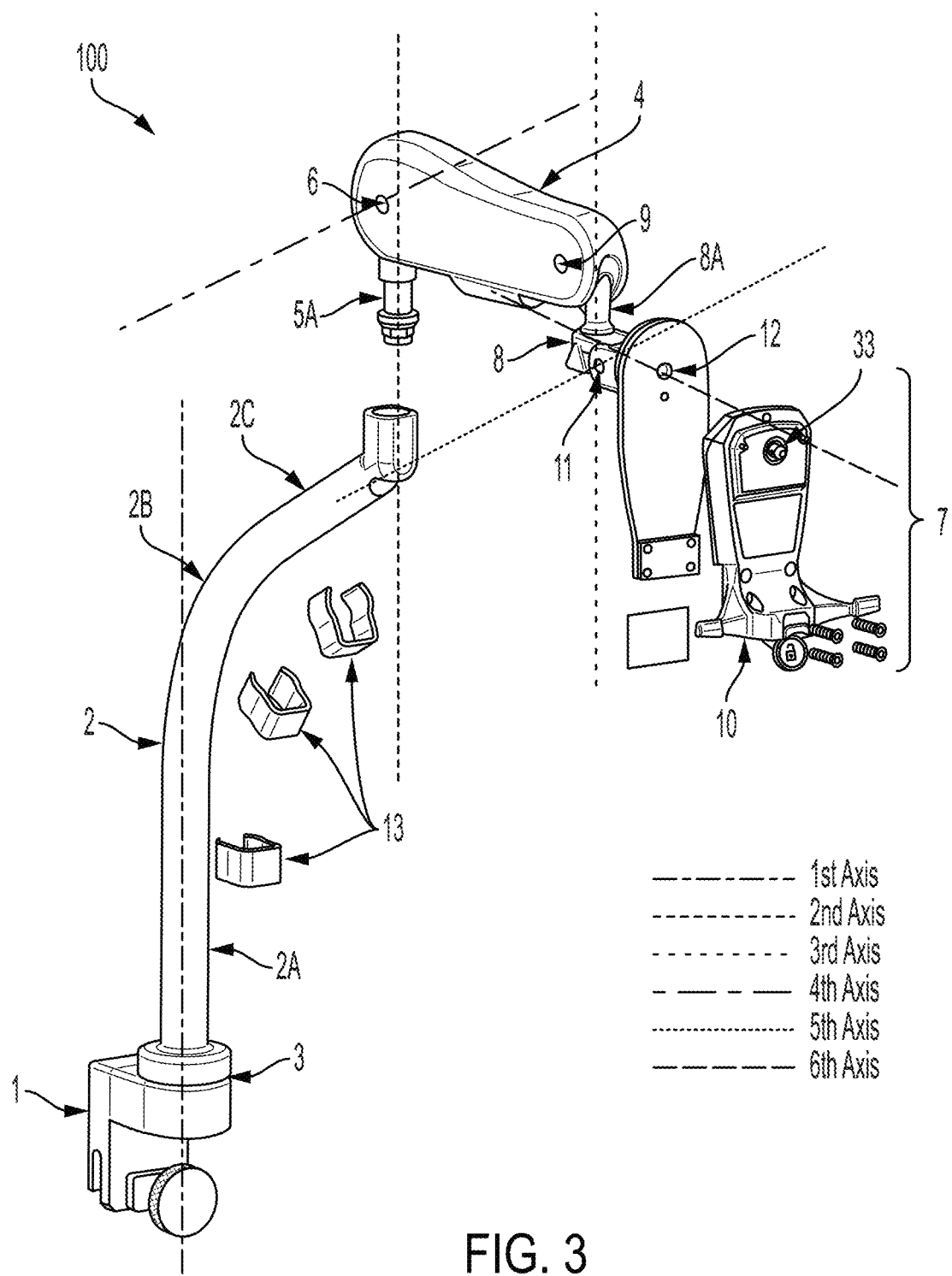
FIG. 3 illustrates an example of an exploded view of a table mount disclosed herein, along with the axes of rotational motion.

Table mount 100 also can include a first arm 2. This first arm (i.e., proximal arm) can be rotatably connected to the clamp at the proximal end of the first arm. The first arm can be rotatably connected to the clamp at a rotational joint 3. In some embodiments, a male projection on the proximal end of the first arm can be rotatably received in a female recess in clamp 1 so as to form rotational joint 3. This rotational joint can allow the first arm to rotate with respect to the clamp around a first axis when the table mount is mounted to the surgical table as shown in FIG. 3. This first axis can be an axis that extends vertically from the plane of the surgical table's top or patient surface. As such, the first axis can be perpendicular to the plane of the surgical table's top or patient surface.

When the table mount is mounted to the surgical table, the first arm can extend vertically from the surgical table. This can be important because the table mount should be able to clear a patient during use so as to avoid unnecessary contact with the patient which can cause potential injuries to the patient or damage to the equipment. As such, Applicant discovered the height requirement for the table mount to clear the worst case patient. This worst case patient was assumed to be the $95^{th}$ percentile of male patients on a 2 inch thick bed pad (assumed to condense to 50% thickness under weight of $95^{th}$ percentile male patient) with a 2.5 inch standard (Berchtold) bed cushion (assumed to condense to 50% thickness under weight of $95^{th}$ percentile male patient) with a one inch thick pillow (placed on top of the patient body, below the arms) and their arms crossed over their chest. The patient's body shape parameters were developed using anthropometric data from the CDC. The maximum sagittal diameter of the abdomen for the $95^{th}$ percentile of males was found using CDC data to be 32.9 cm or 13.0 inches. In addition, the $95^{th}$ percentile male forearm circumference was found to be 12.9 inches based on NASA data. Assuming the forearm to be circular, the resulting diameter was 4.1 inches. To estimate the maximum width of the patient with arms crossed, shoulder breadth (bideltoid) was found for the $95^{th}$ percentile male using NASA data to be 20.9 inches. Accordingly, the table mount can clear a patient height of about 20.35 inches and a width of about 20.9 inches, relative to the top of the bed rail. In some embodiments, the first arm is configured to extend vertically at least about 10 inches, at least about 11 inches, at least about 15 inches, at least about 20 inches, at least about 20.35 inches, at least about 25 inches, or at least about 30 inches above the surgical table when the table mount is mounted to the surgical table. In some embodiments, the first arm is configured to extend vertically at most about 40 inches, at most about 35 inches, at most about 30 inches, at most about 25 inches, at most about 20.35 inches, at most about 20 inches, or at most about 15 inches above the surgical table when the table mount is mounted to the surgical table. In some embodiments, the first arm is configured to extend vertically about 10-40 inches, about 10-35 inches, about 10-30 inches, about 11-25 inches, or about 15-25 inches above the surgical table when the table mount is mounted to the surgical table.

In some embodiments, the first arm can be a straight arm that extends vertically form the surgical table. In some embodiments, the first arm can be a curved first arm wherein a portion of the first arm extends vertically from the surgical table and a portion of the first arm bends and extends away from the vertical axis. The second portion extending away from the vertical axis above the surgical table can bend towards a direction parallel to the plane of the surgical table top/patient surface when mounted to the table.

In some embodiments, the first arm can have multiple members. For example, the first arm can include a first straight member 2A extending vertically from the surgical table. The first straight member can be located at the proximal end of the first arm. In some embodiments, the first straight member can be connected to a curved member 2B that bends away from the vertical axis extending from the surgical table. In some embodiments, the curved member can be connected to a second straight member 2C. The second straight member can be located at the distal end of the first arm.

The table mount can also include a second arm 4 rotatably connected to the first arm 2. This second arm (i.e., distal arm) can be rotatably connected to the distal end of the first arm. Specifically, the second arm can be rotatably connected to the first arm at a rotational joint 5. In embodiments where the first arm is a straight arm that extends vertically from the surgical table, the table mount can include rotational joint 3 or rotational joint 5, but not both. In some embodiments, a male projection 5A on the proximal end of the second arm can be rotatably received by a female recess in the distal end of the first arm so as to form the aforementioned rotational joint 5. This rotational joint can allow the second arm to rotate with respect to the first arm around a second axis as shown in FIG. 3. This second axis can be an axis that extends vertically from the plane of the surgical table's top/patient surface. As such, the second axis can be perpendicular to the plane of the surgical table's top/patient surface. In addition, the second axis can be parallel to the first axis.

When the table mount is mounted to the surgical table, the second arm can extend away from the distal end of the first arm. In some embodiments, the second arm can extend towards a direction parallel to the plane of the surgical table top/patient surface. During surgery, surgeons can adjust the surgical table height to accommodate a comfortable working position with respect to the surgery being performed on the patient. As such, the table mount should be adjustable so that it can accommodate a range of users, assuming the surgical table is adjusted to an optimal working position for a given user. Elbow rest height was assumed to be representative of comfortable working height. Thus, the elbow to eye distance can be used to define the range of distances that the table mount should be able to accommodate. Anthropometric data found in excerpt from Gordon, Claire C. et. Al 1988 Anthropometric Survey of U.S. Personnel: Summary Statistics Interim Report (March 1989) (incorporated herein by reference) for eye height and elbow rest height was used to calculate the nominal elbow to eye distance for $5^{th}$ percentile females and $95^{th}$ percentile males. Applicant discovered that the difference in elbow to eye distance between $5^{th}$ percentile females and $95^{th}$ percentile males was about 6.95 inches. Since the table mount should be able to accommodate a wide range of users, the allowable range of height difference of the touchscreen device should be at least 6.95 inches. In order to accommodate this variable change in height of the touchscreen device, the second arm can include a tilting joint 6. This tilting joint can be internal to the second arm and towards a proximal end of the second arm. Tilting joint 6 can rotate (i.e., tilt) the second arm with respect to the first arm around a fourth axis as shown in FIG. 3. The fourth axis can be an axis that extends in a direction that is parallel with the plane of the surgical table's top surface. In addition, the fourth axis can be perpendicular to the first axis and/or the second axis. In some embodiments, the fourth axis is perpendicular to the first, second, and third axes (discussed below). Because tilting joint 6 can tilt the second arm with respect to the first arm, tilting joint 6 can cause the second arm to be extended vertically upward away from the surgical table top/patient surface or downward towards the surgical table top/patient surface depending on the degree of tilt.

Figure 6:
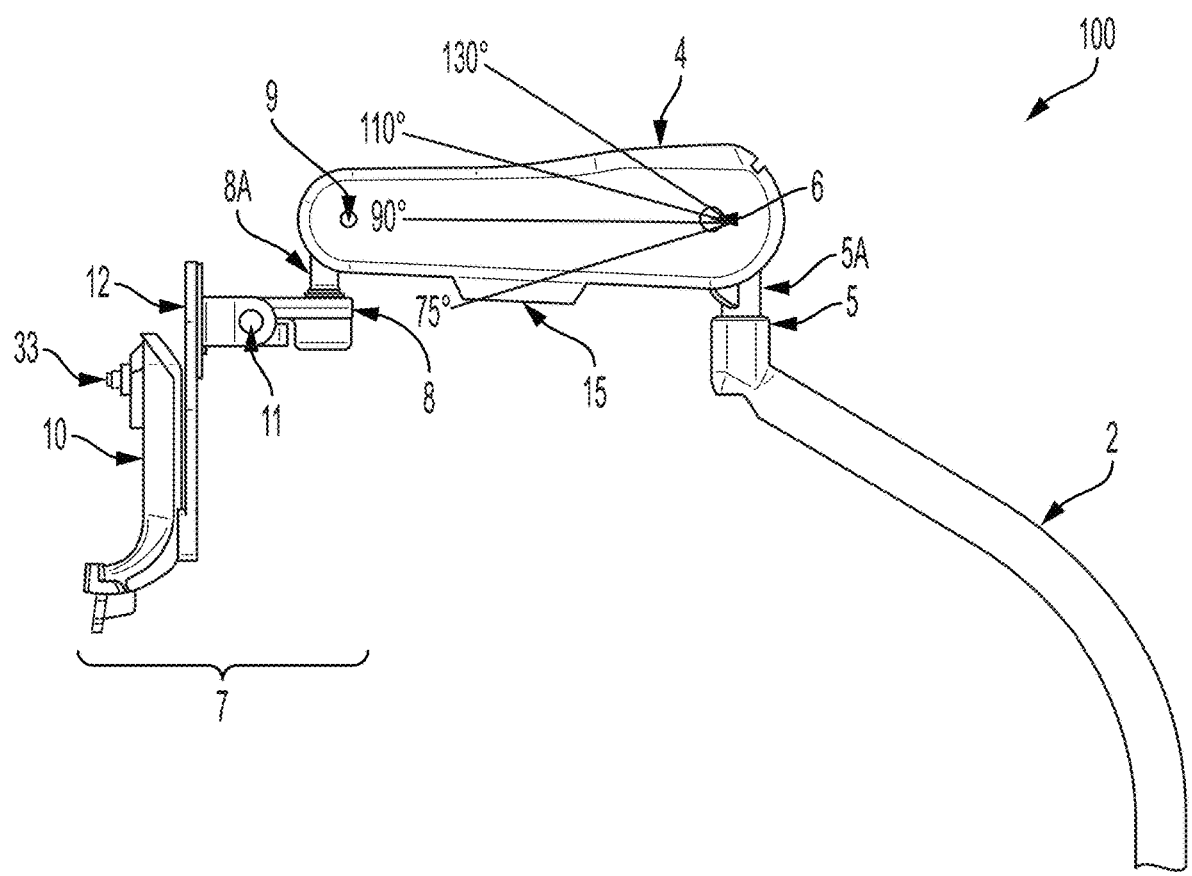
FIG. 6 illustrates examples of how the second arm of a table mount can rotate about its tilting joint.

The largest angle of tilt needed to travel the at least 6.95 inches vertically can be determined by calculating when the bisector of the angle is horizontal (0 degrees). Knowing the length of the second arm and the vertical distance (6.95 inches) that a wide variety of users would have to adjust the height of the touchscreen device, Applicant determined that the second arm must be able to rotate (tilt) about joint 6 at least 48.3 degrees (or at least 24.15 degrees above and below the horizontal (0 degrees)). In some embodiments, the second arm can rotate about joint 6 to an angle of about 75-130 degrees as shown in FIG. 6 wherein 90 degrees is when the second arm is extending in a direction that is parallel to the plane of the surgical table's top/patient surface (i.e., horizontal). Angles below 90 degrees can indicate that the second arm is extending toward the surgical table's top/patient surface and angles above 90 degrees can indicate that the second arm is extending away from the surgical table's top/patient surface. In some embodiments, the second arm can rotate to an angle greater than or equal to about 114.15 degrees wherein 90 degrees is when the second arm is extending in a direction that is parallel to the plane of the surgical table's top/patient surface. In some embodiments, the second arm can rotate to an angle less than or equal to about 65.85 degrees wherein 90 degrees is when the second arm is extending in a direction that is parallel to the plane of the surgical table's top/patient surface.

In addition, Applicant determined the torque required to tilt the second arm with respect to the first arm when the table mount is holding a weight of 4.24-5.28 lbs (estimated to be the weight of a typical touchscreen device) at various positions of 130 degrees, 110 degrees, 90 degrees, and 75 degrees as shown in FIG. 6. In some embodiments, the torque required to rotate the second arm about joints 6 and/or 9 is greater than about 0 in-lbf while a typical touchscreen device is attached to the table mount.

Table mount 100 can also include a touchscreen device docking assembly 7. Touchscreen device docking assembly can be rotatably connected to the distal end of the second arm. In addition, touchscreen device docking assembly can be rotatably connected to the second arm at rotational joint 8. In some embodiments, a male projection 8A on the distal end of the second arm can be rotatably received by a female recess on the touchscreen device docking assembly 7 so as to form the aforementioned rotational joint 8. This rotational joint can allow the docking assembly to rotate with respect to the second arm around a third axis as shown in FIG. 3. This third axis can be an axis that extends vertically from the plane of the surgical table's top/patient surface. As such, the third axis can be perpendicular to the plane of the surgical table's top/patient surface. In addition, the third axis can be parallel to the first axis and/or second axis. Although the second arm can rotate about tilting joint 6, the second arm can also include joint 9 that makes sure the second axis and the third axis are always parallel even if the second arm itself is tilted up or down. As such, the male member 5A and male member 8A as shown in FIG. 3 can always be parallel to each other even if the second arm itself is tilted up or down with respect to the first arm. In some embodiments, the second arm can be a variable height counterbalance arm of the sort available from GCX Corporation of Petaluma, Calif.

The touchscreen device docking assembly can be configured to extend away from the distal end of the second arm. In some embodiments, the touchscreen device docking assembly can extend towards a direction parallel to the plane of the surgical table's top/patient surface. In some embodiments, the touchscreen docking assembly can be configured to extend at least about 10 inches, at least about 15 inches, at least about 20 inches, at least about 20.9 inches, at least about 25 inches, at least about 30 inches, at least about 35 inches across the surgical table in a direction that is parallel with the plane of the surgical table's top/patient surface. In some embodiments, the touchscreen device docking assembly is configured to extend at most about 40 inches, at most about 35 inches, at most about 30 inches, at most about 25 inches, at most about 20.9 inches, at most about 20 inches, or at most about 15 inches across the surgical table in a direction that is parallel with the plane of the surgical table's top/patient surface. In some embodiments, the touchscreen device docking assembly is configured to extend about 10-40 inches, about 10-35 inches, about 10-30 inches, or about 15-25 inches across the surgical table in a direction that is parallel with the plane of the surgical table's top/patient surface.

In some embodiments, the touchscreen device docking assembly can be configured to extend at least about 10 inches, at least about 15 inches, at least about 20 inches, at least about 20.9 inches, at least about 30 inches, or at least about 35 inches across the width of the surgical table. In some embodiments, the touchscreen device docking assembly is configured to extend at most about 40 inches, at most about 35 inches, at most about 30 inches, at most about 25 inches, at most about 20.9 inches, at most about 20 inches, or at most about 15 inches across the width of the surgical table. In some embodiments, the touchscreen device docking assembly is configured to extend about 10-40 inches, about 10-35 inches, about 10-30 inches, or about 15-25 inches across the width of the surgical table. In some embodiments, the touchscreen device docking assembly can be configured to extend at least half the width and no more than the full width of the surgical table.

In addition, the touchscreen device docking assembly can be configured to extend over the surgical table when the table mount is mounted to the surgical table. In some embodiments, the touchscreen device docking assembly is configured to extend vertically at least about 10 inches, at least about 15 inches, at least about 20 inches, at least about 20.35 inches, at least about 25 inches, or at least about 30 above the surgical table when the table mount is mounted to the surgical table. In some embodiments, the touchscreen device docking assembly is configured to extend vertically at most about 40 inches, at most about 35 inches, at most about 30 inches, at most about 25 inches, at most about 20.35 inches, at most about 20 inches, or at most about 15 inches above the surgical table when the table mount is mounted to the surgical table. In some embodiments, the touchscreen device docking assembly is configured to extend vertically about 10-40 inches, about 10-35 inches, about 10-30 inches, about 11-25 inches, or about 15-25 inches above the surgical table when the table mount is mounted to the surgical table.

The touchscreen device docking assembly can include a touchscreen device docking station 10. The touchscreen device docking station can be configured to releasably secure a touchscreen device. The docking station can utilize a ball bearing press-locking mechanism to hold the touchscreen device in place. This lock can be released by a spring-loaded button on the docking station which releases the locking mechanism. In some embodiments, the touchscreen device docking assembly can include joint 11 (e.g., a tilting joint). In some embodiments, the touchscreen device docking assembly does not include joint 11. The tilting joint 11 can rotate the touchscreen device docking station with respect to the second arm around a fifth axis as shown in FIG. 3. The fifth axis can be an axis that extends in a direction that is parallel with the plane of the surgical table's top/patient surface. In addition, the fifth axis can be perpendicular to the first axis, second axis, and/or the third axis. In some embodiments, the fifth axis is perpendicular to the first, second, and third axes. In some embodiments, the touchscreen device docking station is configured to extend vertically at least about 15 inches, at least about 20 inches, at least about 20.35 inches, at least about 25 inches, at least about 30 inches, or at least about 35 inches above the surgical table when the table mount is mounted to the surgical table. In some embodiments, the touchscreen device docking assembly is configured to extend vertically at most about 40 inches, at most about 35 inches, at most about 30 inches, at most about 25 inches, at most about 20.35 inches, at most about 20 inches, or at most about 15 inches above the surgical table when the table mount is mounted to the surgical table. In some embodiments, the touchscreen device docking assembly is configured to extend vertically about 10-40 inches, about 10-35 inches, about 10-30 inches, about 11-25 inches, or about 15-25 inches above the surgical table when the table mount is mounted to the surgical table.

Figure 7:
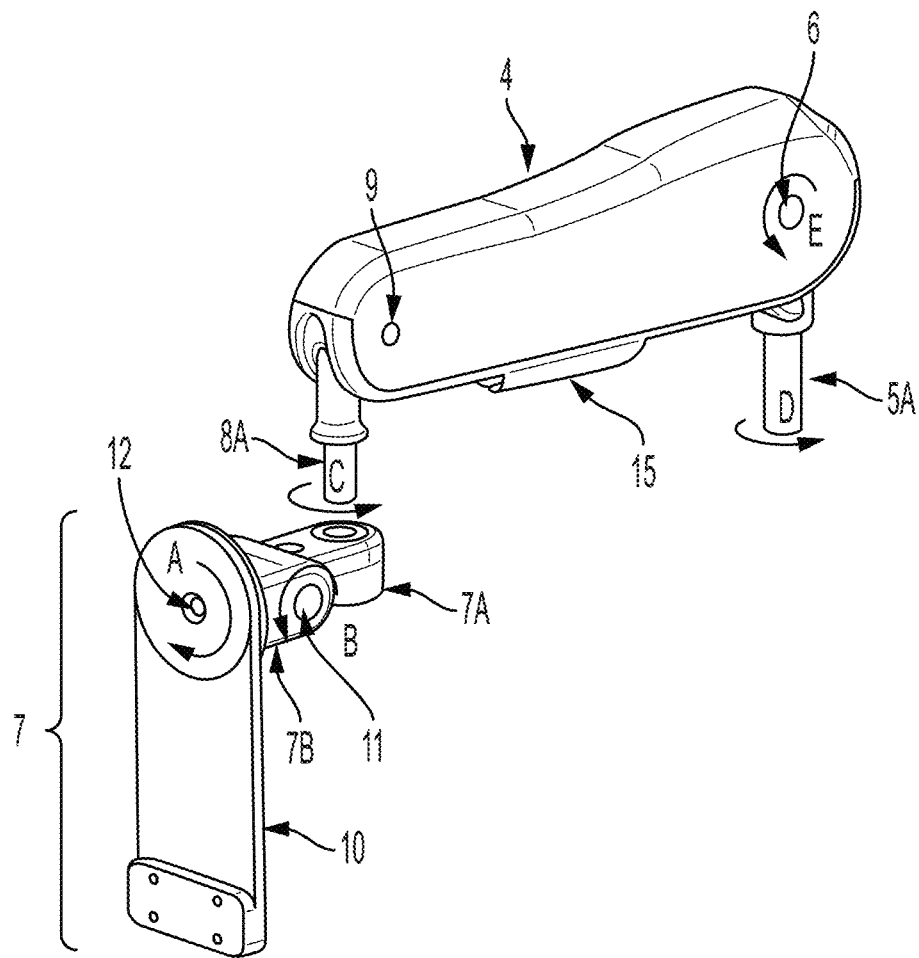
FIG. 7 illustrates examples of how the second arm can rotate about its rotational joint with respect to the first arm, how the second arm can rotate about its tilting joint, how the touchscreen device docking assembly can rotate about its rotational joint with respect to the second arm, how the touchscreen device docking station can rotate about a tilting joint with respect to the second arm, and how the touchscreen device docking station can rotate about a swivel joint.

In some embodiments, the touchscreen device docking assembly can include a first member 7A and a second member 7B as shown in FIG. 7. First member 7A can include a female recess that receives male projection 8A to form rotation joint 8. The second member 7B can be connected to the first member 7A by tilting joint 11. Touchscreen device docking station 10 can be connected to the second member 7B by swivel joint 12.

The swivel joint 12 can rotate the touchscreen device docking station around a sixth axis as shown in FIG. 3. In some embodiments, the touchscreen docking assembly does not include joint 12. The sixth axis can be perpendicular to the fourth and/or fifth axis. In some embodiments, the sixth axis is perpendicular to the fourth and fifth axes. In some embodiments, the touchscreen device docking station can be configured to extend at least about 10 inches, at least about 15 inches, at least about 20 inches, at least about 20.9 inches, at least about 25 inches, at least about 30 inches, or at least about 35 inches across the surgical table in a direction that is parallel with the plane of the surgical table's top/patient surface. In some embodiments, the touchscreen device docking station is configured to extend at most about 40 inches, at most about 35 inches, at most about 30 inches, at most about 25 inches, at most about 20.9 inches, at most about 20 inches, or at most about 15 inches across the surgical table in a direction that is parallel with the plane of the surgical table's top/patient surface. In some embodiments, the touchscreen device docking station is configured to extend about 10-40 inches, about 10-35 inches, about 10-30 inches, or about 15-25 inches across the surgical table in a direction that is parallel with the plane of the surgical table's top/patient surface.

In some embodiments, the touchscreen device docking station can be configured to extend at least about 10 inches, at least about 15 inches, at least about 20 inches, or at least about 20.9 inches, at least about 25 inches, at least about 30 inches, or at least about 35 inches across the width of the surgical table. In some embodiments, the touchscreen device docking station is configured to extend at most about 40 inches, at most about 35 inches, at most about 30 inches, at most about 25 inches, at most about 20.9 inches, at most about 20 inches, or at most about 15 inches across the width of the surgical table. In some embodiments, the touchscreen device docking station is configured to extend about 10-40 inches, about 10-35 inches, about 10-30 inches, or about 15-25 inches across the width of the surgical table.

In some embodiments, the touchscreen device docking station can be configured to extend at least half the width and no more than the full width of the surgical table. In addition, the touchscreen device docking station can be configured to extend over the surgical table when the table mount is mounted to the surgical table. In some embodiments, the touchscreen device docking station is configured to extend vertically at least about 15 inches, at least about 20 inches, at least about 20.35 inches, at least about 25 inches, at least about 30 inches, or at least about 35 inches above the surgical table when the table mount is mounted to the surgical table. In some embodiments, the touchscreen device docking station is configured to extend vertically at most about 40 inches, at most about 35 inches, at most about 30 inches, at most about 25 inches, at most about 20.35 inches, at most about 20 inches, or at most about 15 inches above the surgical table when the table mount is mounted to the surgical table. In some embodiments, the touchscreen device docking station is configured to extend vertically about 10-40 inches, about 10-35 inches, about 10-30 inches, about 11-25 inches, or about 15-25 inches above the surgical table when the table mount is mounted to the surgical table.

The table mount disclosed herein has the versatility to accommodate multiple users and multiple set-up conditions. This versatility can be an output of the range of motion of each of the six joint (Joints 3, 5, 6, 8, 11, and 12) axes of movement. In addition, it can be important to prevent the touchscreen device itself from accidentally entering the actual surgical field during the procedure or accidentally bumping into the patient during the procedure.

The first arm can be primarily moved during set-up to position the arm in a position such that the touchscreen device can be moved to a comfortable working position for the user. Typical positions of the first arm can include the distal end of the first arm positioned parallel to the bed rail or perpendicular to the bed rail. To allow freedom of positioning during set-up, the first arm can rotate at least about 270 degrees around joint 3. In some embodiments, the first arm can rotate 360 degrees around joint 3. As discussed above, the second arm can rotate about joint 5 relative to the first arm in order to better position the touchscreen device. In some embodiments, the second arm can rotate at least about 270 degrees around joint 5. In some embodiments, the second arm can rotate at least about 360 degrees around joint 5. The rotation (or tilt) around joint 6 was previously discussed above. As previously discussed, the touchscreen device docking assembly can be rotatably connected to the distal end of the second arm to rotate around joint 8. In some embodiments, the touchscreen device docking assembly can rotate at least about 135 degrees, at least about 180 degrees, or at least about 270 degrees around joint 8.

The tilting joint 11 can rotate the touchscreen device docking station with respect to the second arm. During surgery, there may be no need for the surgeon to be able to look up towards the screen as their focus during a procedure will be either downwards or straight ahead. Thus, in some embodiments, the tilting joint 11 can only rotate the touchscreen docking station away (upward) from the surgical table's top/patient surface. In some embodiments, the tilting joint 11 can rotate the touchscreen docking station at least about 20 degrees, at least about 25 degrees, or at least about 30 degrees.

The swivel joint 12 can rotate the touchscreen device docking station around a sixth axis as shown in FIG. 3. Ideally, a surgeon uses a touchscreen device with the horizontal edge of the device parallel to the floor. In order to accommodate this orientation at the maximum Trendelenburg for Hip Arthroscopy, the touchscreen device should be able to swivel (rotate) at least about 5 degrees, at least about 10 degrees, or at least about 15 degrees in each direction of the horizontal position.

Figure 4:
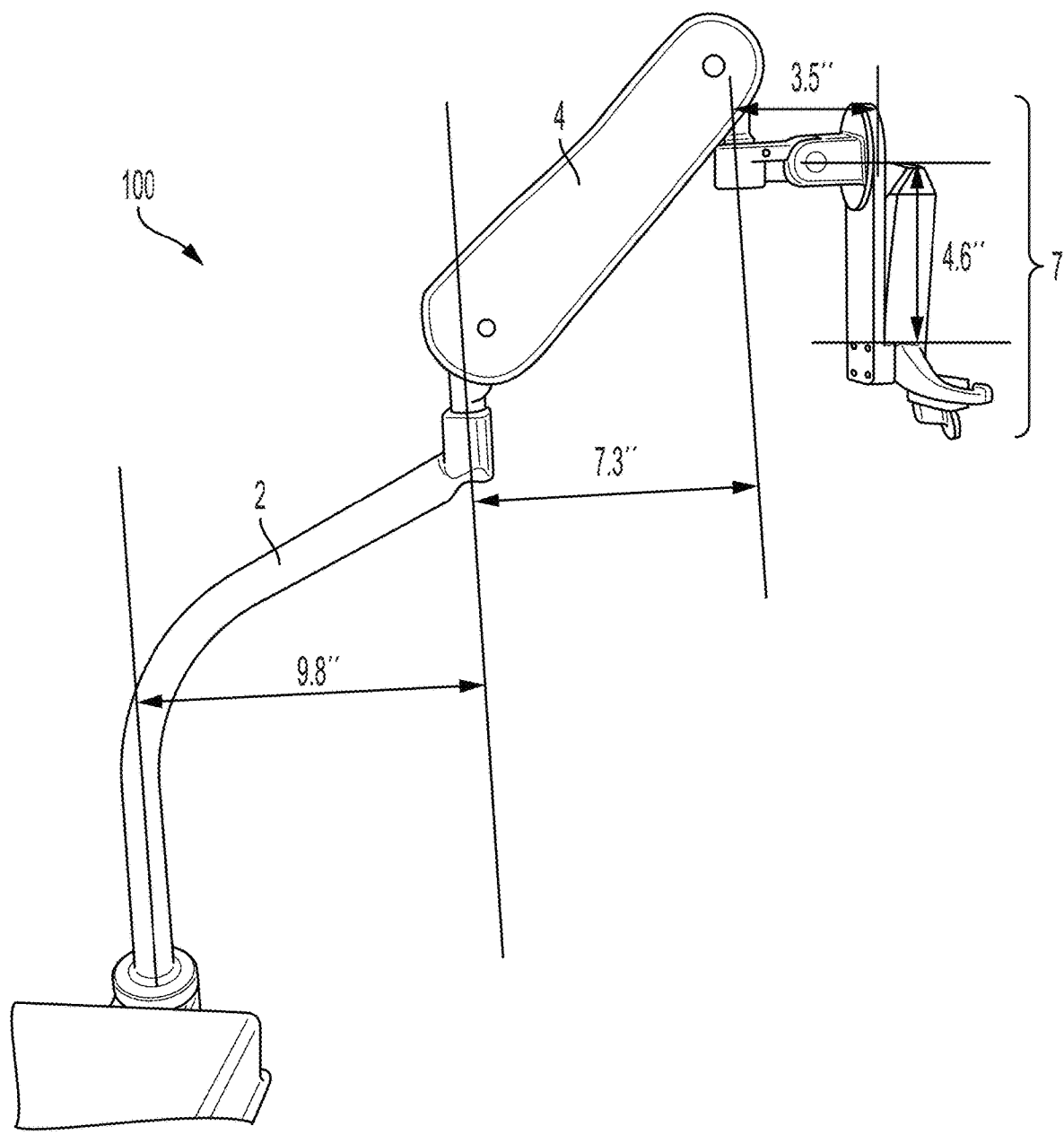
FIG. 4 illustrates an example of a table mount with moment arms for calculating the various joint torque measurements as disclosed herein.

In some embodiments, at least one of the joints in the table mount can be a friction joint. As discussed above, the user of the table mount may need to touch the touchscreen during surgery or adjust the device. As such, the table mount's joints should be easy enough for a typical user to move around/adjust during surgery, but not so easy such that touch inputs on the touchscreen device will cause unwanted movement of the table mount. To set the acceptable torque specifications for the movement of the rotational joint connected the clamp and the first arm, human factor trials were performed with numerous users. First, a table mount was attached to a surgical table and each joint was tightened to a firm but seemingly acceptable torque required for motion. Next, with no touchscreen device attached, a force gauge was used to measure the force required to initiate motion of each joint and the moment arm was measured from the point of force application to the axis of rotation. FIG. 4 illustrates a table mount with moment arms for the various torque force measurements. Users were shown a reference table mount, set up in a specific orientation and asked to set up the table mount as if they were operating in an equivalent orientation. Once the users had set-up the table mount, they were asked to analyze the torque required to move each member as acceptable or unacceptable. Based on user feedback, certain joints of the table mount were tightened or loosened for the next user. This process was repeated with ten users to determine the upper limits of acceptable torque for each member of the table mount. Table 1 below provides the forces, the moment arms, as well as the upper torque limit of the acceptable motion for the various table mount members.

TABLE 1

| Joint Motion | Force (ibf) | Moment Arm (in) | Torque (in-lbf) |
| --- | --- | --- | --- |
| First arm rotation with respect to the clamp (Joint 3) | 15.5 | 9.8 | 151.9 |
| Second arm rotation with respect to the first arm (Joint 5) | 9.0 | 7.3 | 65.7 |
| Touchscreen device docking assembly rotation with respect to the second arm (Joint 8) | 14.5 | 3.5 | 50 |
| Tilt of touchscreen device docking station (Joint 11) | 12.7 | 4.6 | 58.9 |
| Swivel of touchscreen device docking station (Joint 12) | 11.0 | 4.6 | 51.0 |

Applicant also discovered the minimum torque requirements to move each member of the table mount. The criterion for the table mount stability was determined at a worst case orientation. This test was performed individually for the motion of each joint.

Figure 5:
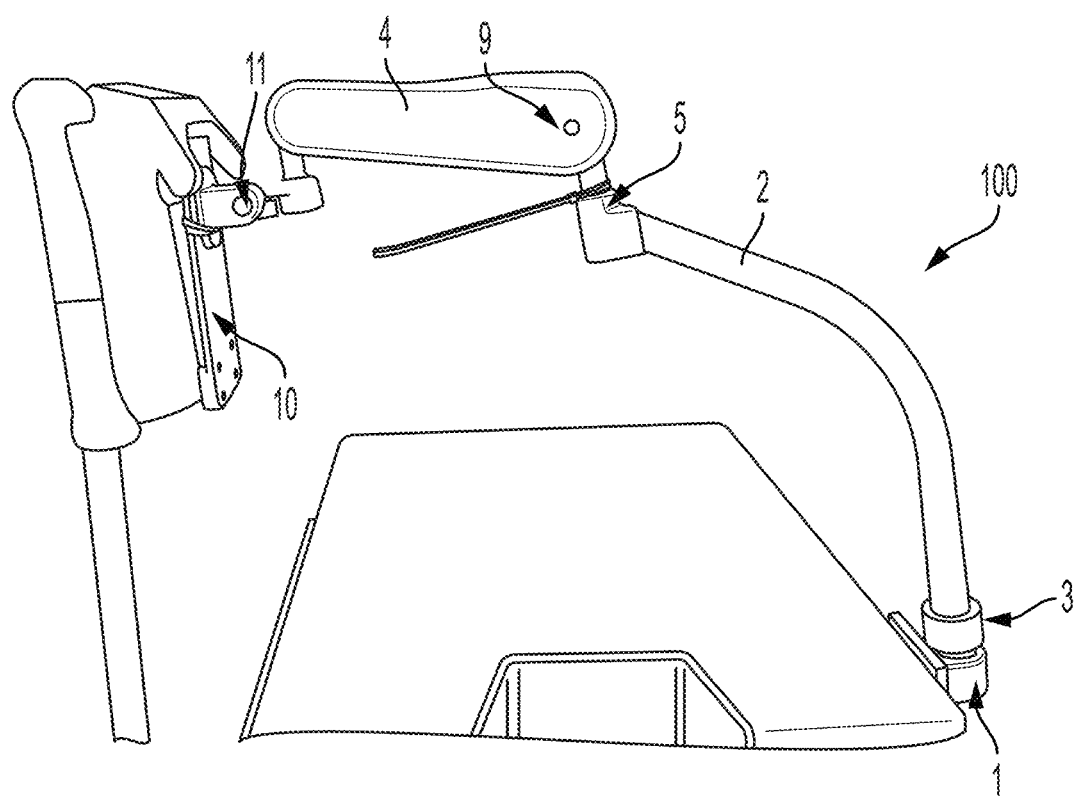
FIG. 5 illustrates an example of a table mount mounted to a surgical table with its center of mass furthest from its axis of rotation between the clamp and the first arm.

To determine the minimum acceptable force for the first arm rotation with respect to the clamp (Joint 3), the table mount was set-up in a worst case orientation and the table was tilted to 17.5 degrees of Trendelenburg. 17.5 degrees was chosen as a conservative estimate to account for over-tilting the bed, then correcting to 15 degrees (maximum recommended angle for traction under Trendelenburg). The worst case orientation consisted of the first arm normal to the side of the bed, the second arm extended in line with the first arm, and the touchscreen device docking assembly in line with both the second and first arms, while holding a touchscreen device. Each joint other than the joint under evaluation was tightened such that it would not move before the joint under evaluation. FIG. 5 illustrates this worst case orientation. This orientation is considered worst case orientation because the table mount's center of mass is further from the axis of rotation (1' axis in FIG. 3). The initial force to move the first arm was measured, without the touchscreen device attached, and torque was calculated per the moment arms discussed above. The touchscreen device was then attached and the table was tilted. Any movement of the table mount was observed. If there was no motion, with the bed at 17.5 degree Trendelenburg, the joint was moved manually to be sure the joint could be moved and re-stabilized. This process was repeated until the lowest stable torque was found. An equivalent process was performed for the rotation of the second arm with respect to the first arm (Joint 5) and the rotation of the touchscreen device docking assembly with respect to the second arm (Joint 8).

The force to tilt the touchscreen device docking station was also measured, without the touchscreen device attached, and torque was calculated per the moment arms defined above. The lowest acceptable torque was found for the tilt by maneuvering the touchscreen device into multiple positions along the range of motion of the tilting joint 11. The torque was acceptable if there was no involuntary movement of the touchscreen device after positioning. This process was repeated until the lowest stable torque was found. An equivalent process for the tilt of the touchscreen device docking station was performed for the swivel of the touchscreen device docking station (Joint 12). Table 2 below shows the minimum acceptable torques for each of the five types of motion under evaluation for the table mount.

TABLE 2

| Joint Motion | Force (ibf) | Moment Arm (in) | Torque (in-lbf) |
| --- | --- | --- | --- |
| First arm rotation with respect to the clamp (Joint 3) | 7 | 9.8 | 68.6 |
| Second arm rotation with respect to the first arm (Joint 5) | 5.1 | 7.3 | 37.2 |
| Touchscreen device docking assembly rotation with respect to the second arm (Joint 8) | 4.2 | 3.5 | 14.5 |
| Tilt of touchscreen device docking station (Joint 11) | 5.8 | 4.6 | 26.9 |
| Swivel of touchscreen device docking station (Joint 12) | 2.3 | 4.6 | 10.7 |

In some embodiments, the torque required to rotate the first arm about joint 3 is at least about 50 in-lbf, at least about 55 in-lbf, at least about 50 in-lbf, at least about 65 in-lbf, at least about 70 in-lbf, at least about 75 in-lbf, at least about 80 in-lbf, at least about 85 in-lbf, or at least about 90 in-lbf. In some embodiments, the torque required to rotate the first arm about joint 3 is at most about 200 in-lbf, at most about 190 in-lbf, at most about 180 in-lbf, at most about 170 in-lbf, at most about 165 in-lbf, at most about 160 in-lbf, at most about 155 in-lbf, at most about 151.9 in-lbf, at most about 150 in-lbf, at most about 145 in-lbf, at most about 140 in-lbf, or at most about 135 in-lbf. In some embodiments, the torque required to rotate the first arm about joint 3 is about 50-200 in-lbf, about 60-175 in-lbf, about 65-160 in-lbf, or about 68.6-151.9 in-lbf.

In some embodiments, the torque required to rotate the second arm about joint 5 is at least about 20 in-lbf, at least about 25 in-lbf, at least about 30 in-lbf, at least about 35 in-lbf, at least about 37.2 in-lbf, at least about 40 in-lbf, at least about 45 in-lbf, at least about 50 in-lbf, or at least about 55 in-lbf. In some embodiments, the torque required to rotate the second arm about joint 5 is at most about 100 in-lbf, at most about 90 in-lbf, at most about 80 in-lbf, at most about 75 in-lbf, at most about 70 in-lbf, at most about 65.7 in-lbf, at most about 65 in-lbf, at most about 60 in-lbf, or at most about 55 in-lbf. In some embodiments, the torque required to rotate the second arm about joint 5 is about 20-100 in-lbf, about 30-70 in-lbf, or about 37.2-65.7 in-lbf.

In some embodiments, the torque required to rotate the touchscreen device docking assembly about joint 8 is at least about 1 in-lbf, at least about 5 in-lbf, at least about 10 in-lbf, at least about 14.5 in-lbf, at least about 15 in-lbf, at least about 20 in-lbf, at least about 25 in-lbf, at least about 30 in-lbf, or at least about 35 in-lbf. In some embodiments, the torque required to rotate the touchscreen device docking assembly about joint 8 is at most about 100 in-lbf, at most about 90 in-lbf, at most about 80 in-lbf, at most about 70 in-lbf, at most about 60 in-lbf, at most about 55 in-lbf, at most about 50 in-lbf, at most about 45 in-lbf, or at most about 40 in-lbf. In some embodiments, the torque required to rotate the touchscreen device docking assembly about joint 8 is about 1-100 in-lbf, about 10-60 in-lbf, or about 14.5-50.0 in-lbf.

In some embodiments, the torque required to rotate the touchscreen device docking station about joint 11 is at least about 10 in-lbf, at least about 15 in-lbf, at least about 20 in-lbf, at least about 25 in-lbf, at least about 26.9 in-lbf, at least about 30 in-lbf, at least about 35 in-lbf, at least about 40 in-lbf, or at least about 45 in-lbf. In some embodiments, the torque required to rotate the touchscreen device docking station about joint 11 is at most about 100 in-lbf, at most about 90 in-lbf, at most about 80 in-lbf, at most about 70 in-lbf, at most about 60 in-lbf, at most about 58.9 in-lbf, at most about 55 in-lbf, at most about 50 in-lbf, or at most about 45 in-lbf. In some embodiments, the torque required to rotate the touchscreen device docking station about joint 11 is about 10-100 in-lbf, about 20-70 in-lbf, or about 26.9-58.9 in-lbf.

In some embodiments, the torque required to rotate the touchscreen device docking station about joint 12 is at least about 1 in-lbf, at least about 5 in-lbf, at least about 10 in-lbf, at least about 10.7 in-lbf, at least about 15 in-lbf, at least about 20 in-lbf, at least about 25 in-lbf, at least about 30 in-lbf, or at least about 35 in-lbf. In some embodiments, the torque required to rotate the touchscreen device docking station about joint 12 is at most about 100 in-lbf, at most about 90 in-lbf, at most about 80 in-lbf, at most about 70 in-lbf, at most about 60 in-lbf, at most about 55 in-lbf, at most about 51 in-lbf, at most about 50 in-lbf, or at most about 45 in-lbf. In some embodiments, the torque required to rotate the touchscreen device docking station about joint 12 is about 1-100 in-lbf, about 5-60 in-lbf, or about 10.7-51.0 in-lbf.

In some embodiments, when the table mount is attached to a surgical table in the horizontal position and no touchscreen device is connected to the docking station, the torque required to rotate the first arm about joint 3 is at least about 50 in-lbf, at least about 55 in-lbf, at least about 50 in-lbf, at least about 65 in-lbf, at least about 70 in-lbf, at least about 75 in-lbf, at least about 80 in-lbf, at least about 85 in-lbf, or at least about 90 in-lbf. In some embodiments, when the table mount is attached to a surgical table in the horizontal position and no touchscreen device is connected to the docking station, the torque required to rotate the first arm about joint 3 is at most about 200 in-lbf, at most about 190 in-lbf, at most about 180 in-lbf, at most about 170 in-lbf, at most about 165 in-lbf, at most about 160 in-lbf, at most about 155 in-lbf, at most about 151.9 in-lbf, at most about 150 in-lbf, at most about 145 in-lbf, at most about 140 in-lbf, or at most about 135 in-lbf. In some embodiments, when the table mount is attached to a surgical table in the horizontal position and no touchscreen device is connected to the docking station, the torque required to rotate the first arm about joint 3 is about 50-200 in-lbf, about 60-175 in-lbf, about 65-160 in-lbf, or about 68.6-151.9 in-lbf.

In some embodiments, when the table mount is attached to a surgical table in the horizontal position and no touchscreen device is connected to the docking station, the torque required to rotate the second arm about joint 5 is at least about 20 in-lbf, at least about 25 in-lbf, at least about 30 in-lbf, at least about 35 in-lbf, at least about 37.2 in-lbf, at least about 40 in-lbf, at least about 45 in-lbf, at least about 50 in-lbf, or at least about 55 in-lbf. In some embodiments, when the table mount is attached to a surgical table in the horizontal position and no touchscreen device is connected to the docking station, the torque required to rotate the second arm about joint 5 is at most about 100 in-lbf, at most about 90 in-lbf, at most about 80 in-lbf, at most about 75 in-lbf, at most about 70 in-lbf, at most about 65.7 in-lbf, at most about 65 in-lbf, at most about 60 in-lbf, or at most about 55 in-lbf. In some embodiments, when the table mount is attached to a surgical table in the horizontal position and no touchscreen device is connected to the docking station, the torque required to rotate the second arm about joint 5 is about 20-100 in-lbf, about 30-70 in-lbf, or about 37.2-65.7 in-lbf.

In some embodiments, when the table mount is attached to a surgical table in the horizontal position and no touchscreen device is connected to the docking station, the torque required to rotate the touchscreen device docking assembly about joint 8 is at least about 1 in-lbf, at least about 5 in-lbf, at least about 10 in-lbf, at least about 14.5 in-lbf, at least about 15 in-lbf, at least about 20 in-lbf, at least about 25 in-lbf, at least about 30 in-lbf, or at least about 35 in-lbf. In some embodiments, when the table mount is attached to a surgical table in the horizontal position and no touchscreen device is connected to the docking station, the torque required to rotate the touchscreen device docking assembly about joint 8 is at most about 100 in-lbf, at most about 90 in-lbf, at most about 80 in-lbf, at most about 70 in-lbf, at most about 60 in-lbf, at most about 55 in-lbf, at most about 50 in-lbf, at most about 45 in-lbf, or at most about 40 in-lbf. In some embodiments, when the table mount is attached to a surgical table in the horizontal position and no touchscreen device is connected to the docking station, the torque required to rotate the touchscreen device docking assembly about joint 8 is about 1-100 in-lbf, about 10-60 in-lbf, or about 14.5-50.0 in-lbf.

In some embodiments, when the table mount is attached to a surgical table in the horizontal position and no touchscreen device is connected to the docking station, the torque required to rotate the touchscreen device docking station about joint 11 is at least about 10 in-lbf, at least about 15 in-lbf, at least about 20 in-lbf, at least about 25 in-lbf, at least about 26.9 in-lbf, at least about 30 in-lbf, at least about 35 in-lbf, at least about 40 in-lbf, or at least about 45 in-lbf. In some embodiments, when the table mount is attached to a surgical table in the horizontal position and no touchscreen device is connected to the docking station, the torque required to rotate the touchscreen device docking station about joint 11 is at most about 100 in-lbf, at most about 90 in-lbf, at most about 80 in-lbf, at most about 70 in-lbf, at most about 60 in-lbf, at most about 58.9 in-lbf, at most about 55 in-lbf, at most about 50 in-lbf, or at most about 45 in-lbf. In some embodiments, when the table mount is attached to a surgical table in the horizontal position and no touchscreen device is connected to the docking station, the torque required to rotate the touchscreen device docking station about joint 11 is about 10-100 in-lbf, about 20-70 in-lbf, or about 26.9-58.9 in-lbf.

In some embodiments, when the table mount is attached to a surgical table in the horizontal position and no touchscreen device is connected to the docking station, the torque required to rotate the touchscreen device docking station about joint 12 is at least about 1 in-lbf, at least about 5 in-lbf, at least about 10 in-lbf, at least about 10.7 in-lbf, at least about 15 in-lbf, at least about 20 in-lbf, at least about 25 in-lbf, at least about 30 in-lbf, or at least about 35 in-lbf. In some embodiments, when the table mount is attached to a surgical table in the horizontal position and no touchscreen device is connected to the docking station, the torque required to rotate the touchscreen device docking station about joint 12 is at most about 100 in-lbf, at most about 90 in-lbf, at most about 80 in-lbf, at most about 70 in-lbf, at most about 60 in-lbf, at most about 55 in-lbf, at most about 51 in-lbf, at most about 50 in-lbf, or at most about 45 in-lbf. In some embodiments, when the table mount is attached to a surgical table in the horizontal position and no touchscreen device is connected to the docking station, the torque required to rotate the touchscreen device docking station about joint 12 is about 1-100 in-lbf, about 5-60 in-lbf, or about 10.7-51.0 in-lbf.

Accordingly, the friction joints can maintain the position of the touchscreen device when a user input force is applied to the touchscreen device and can allow movement of at least one of the friction joints when a force greater than a user input force is applied to the touchscreen device.

Figure 8:
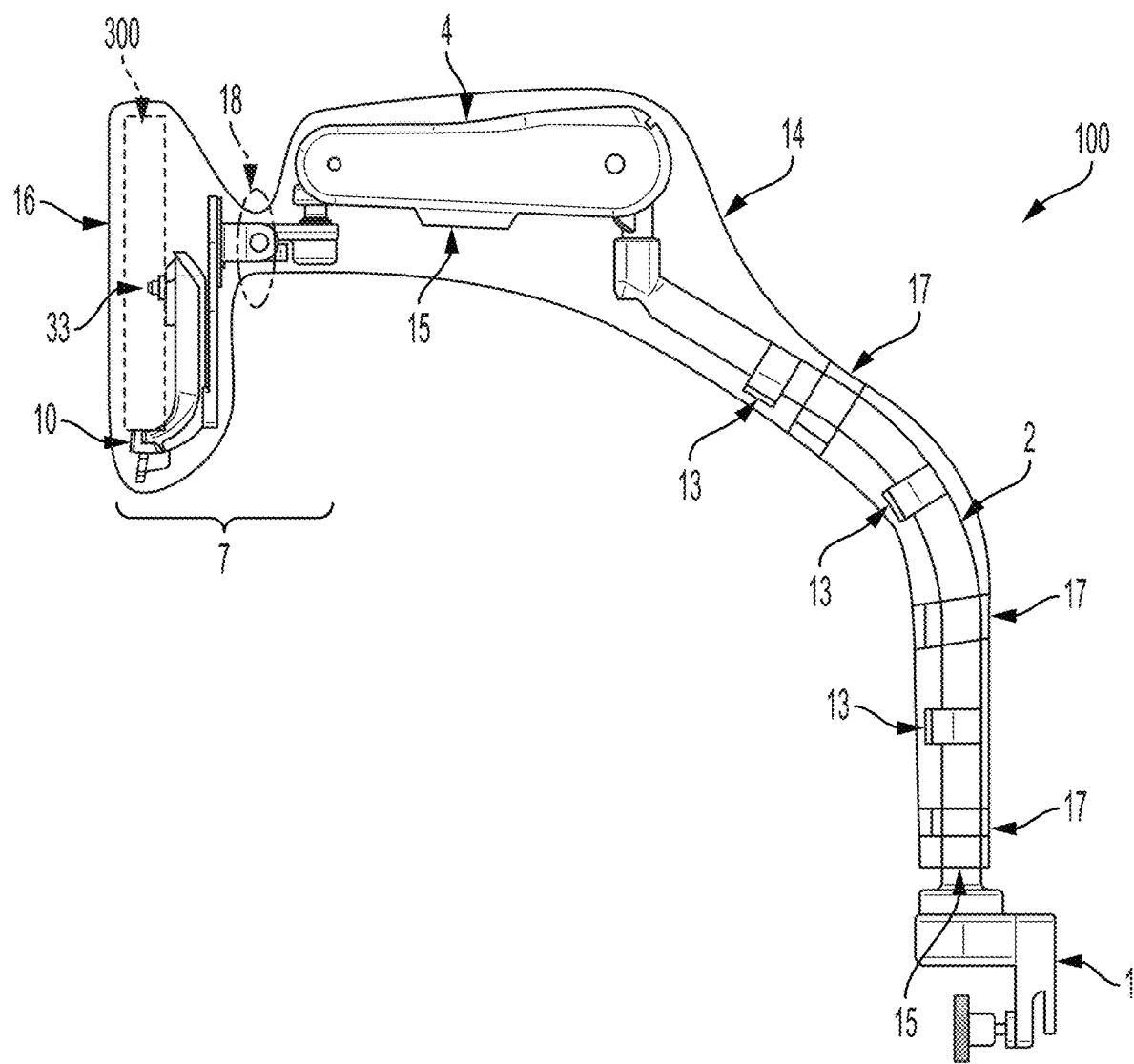
FIG. 8 illustrates an example of a table mount covered by a medical drape as disclosed herein.

In certain situations, the touchscreen device may require cables to be connected to it. For example, the touchscreen device may need a power cord, video cables, and/or display ports connected to it or another connection with another computing device. In these situations, cable clamps 13 can be used to secure the cables to the first arm such that the cables are not in the way during the procedure. As such, these cable clamps can connect to the first arm at a plurality of locations along the first arm. In addition, the underside of the second arm can include a flap clip that can be used to secure the cables to the second arm such that the cables are not in the way during the procedure. Accordingly, the cables that are connected to the touchscreen device can be clipped to the underside of the second arm and then clamped to the first arm. In some embodiments, it may be desirable to wrap the touchscreen device and table mount in a disposable drape 14 so as to maintain sterility in the surgical field as shown by FIG. 8. The drape can be a bag-like configuration with an open end 15 disposed near the clamp 1 and the closed end 16 fitted over touchscreen device 300. In some embodiments, ties 17 may be provided to secure the drape to the first arm. In some embodiments, a loop (e.g., an elastic loop) 18 can be used to secure the drape to the touchscreen device docking assembly. The loop can be used to hold the drape taut over the touchscreen device so that a user can easily manipulate touchscreen device without being interfered with by creases or folds in the drape.

Prior to performing a surgery, the table mount can be setup. First, the clamp of the table mount can be connected to the surgical table. Next, the touchscreen device can be attached to the touchscreen device docking station of the table mount. If the touchscreen device requires cables, the cables can then be connected to the touchscreen device. These cables can then be secured the table mount using various clamps or clips as described above. Next, a user can move and adjust the table mount to the optimal position for surgical use. Optionally, a drape can be applied over the touchscreen device and table mount and secured to the table mount using straps and an elastic loop(s).

After the procedure is over, the table mount can be moved such that it is no longer over the patient. Next, the straps and elastic loop can be removed in order to remove the drape from the table mount. After the drape is removed, the any cables can be unclipped/unclamped and removed from the table mount. Next, the touchscreen device can be released from the touchscreen device docking station. Finally, the table mount itself can be unclamped from the surgical table.

Because the table mount is easily mountable to a surgical table, the table mount should be relatively light weight for a typical user to maneuver and clamp to the surgical table. The table mounts disclosed herein can weigh about 2-20 pounds, about 5-15 pounds, about 6-12 pounds, about 8-10 pounds, or about 9 pounds. As such, the various components of this system can be made up of aluminum, stainless steel, other metals, and/or plastic.

In some embodiments, at least one of the arms (or arm and joint combination) of the table mount can include multiple segments of interlocking balls and sockets. A cable or wire can run through these interlocking multiple segments such that when the cable/wire is under tension, the segments will compress against each other, thereby tightening the arm making it more stationary and less maneuverable. Removing tension from the cable/wire can loosen the arm and make it more maneuverable.

In some embodiments, at least one of the arms (or arm and joint combination) of the table mount can include articulating arms connected with ball and socket joints. The articulating arms can have rods inside such that a cam can be turned to move the arms outward, thereby locking the joints.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Although continuously referenced herein as a "touchscreen device" or "tablet", the touchscreen device/tablet does not necessarily have to be a touchscreen device or a tablet. For example, it can simply be a display screen such as a computer monitor or the table mount can be used to hold a non-digital item for display such as a book or other document.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A method of attaching a table mount to a surgical table, comprising:
   attaching a table mount to a rail of a surgical table;
   attaching a touchscreen device to the table mount;
   placing a patient on the surgical table;
   adjusting the table mount to a position over the patient;
   repositioning the table mount and touchscreen device via a user force applied to the touchscreen device that overcomes a frictional force of at least one joint of the table mount, wherein the frictional force is sufficient to maintain the table mount and touchscreen device in position after the user releases the touchscreen device; and
   receiving touch inputs to the touchscreen device, wherein the frictional force of the at least one joint is sufficient to maintain the touchscreen device in position while the touchscreen device receives the touch inputs.

2. The method of claim 1, wherein the touchscreen device extends vertically at least 20.35 inches above the rail of the surgical table.

3. The method of claim 2, wherein the touchscreen devices extends horizontally at least 20.9 inches away from the rail of the surgical table.

4. The method of claim 1, wherein adjusting the table mount over the patient comprises rotating the table mount over the patient.

5. The method of claim 1, further comprising adjusting a height of the touchscreen device connected to the table mount.

6. The method of claim 5, wherein the height of the touchscreen device is adjusted vertically at least 6.95 inches.

7. The method of claim 1, further comprising tilting the touchscreen device connected to the table mount.

8. The method of claim 1, further comprising rotating the touchscreen device connected to the table mount.

9. The method of claim 1, wherein the table mount is configured to adjust the touchscreen device with six degrees of freedom.

10. The method of claim 1, further comprising connecting a cable to the touchscreen device.

11. The method of claim 10, further comprising securing the cable to the table mount.

12. The method of claim 1, further comprising covering the touchscreen device and a portion of the table mount with a drape.

13. The method of claim 12, further comprising securing the drape to the touchscreen device and/or the portion of the table mount.

14. The method of claim 13, wherein the drape is secured to the touchscreen device and/or portion of the table mount with an elastic loop.

15. The method of claim 12, further comprising adjusting the table mount such that the touchscreen device and table mount are no longer over the patient.

16. The method of claim 14, further comprising removing the drape from the table mount and touchscreen device.

17. The method of claim 15, further comprising removing the touchscreen device from the table mount.

18. The method of claim 16, further comprising removing the table mount from the rail of the surgical table.

19. The method of claim 1, further comprising tilting the surgical table.

20. The method of claim 19, wherein the table mount remains in the adjusted position when the surgical table is tilted.

21. The method of claim 19, further comprising adjusting the table mount to a second position such that the touchscreen device is tilted relative to the tilted surgical table.

22. The method of claim 1, further comprising adjusting the table mount to a second position such that the touchscreen device is viewed from either side of the surgical table.

23. The method of claim 1, wherein the surgical table is located in an operating room, the table mount is attached to a non-operative side of the surgical table, the table mount extends toward an operative side of the surgical table, and the touch inputs are received from a surgeon located on the operative side of the surgical table.

* * * * *